United States Patent
Patil et al.

(10) Patent No.: US 8,667,169 B2
(45) Date of Patent: Mar. 4, 2014

(54) SYSTEM AND METHOD FOR PROVIDING ARGUMENT MAPS BASED ON ACTIVITY IN A NETWORK ENVIRONMENT

(75) Inventors: Deepti Patil, San Jose, CA (US); Satish K. Gannu, San Jose, CA (US); Ashutosh A. Malegaonkar, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 232 days.

(21) Appl. No.: 12/971,852

(22) Filed: Dec. 17, 2010

(65) Prior Publication Data

US 2012/0158989 A1    Jun. 21, 2012

(51) Int. Cl.
*G06F 15/16* (2006.01)
*H04L 12/56* (2011.01)
*H04L 29/06* (2006.01)

(52) U.S. Cl.
CPC ............... *H04L 47/10* (2013.01); *H04L 29/06* (2013.01); *Y10S 707/966* (2013.01); *Y10S 707/967* (2013.01); *Y10S 707/968* (2013.01); *Y10S 707/969* (2013.01); *Y10S 707/97* (2013.01); *Y10S 707/971* (2013.01); *Y10S 707/972* (2013.01); *Y10S 707/973* (2013.01); *Y10S 707/974* (2013.01)
USPC ........... 709/235; 709/227; 709/228; 709/229; 709/232; 709/233; 709/234; 370/229; 370/230; 370/230.1; 370/231; 370/232; 370/233; 370/234; 370/235; 370/237; 704/270.1; 707/770; 707/966; 707/967; 707/968; 707/969; 707/970; 707/971; 707/972; 707/973; 707/974; 715/234; 715/235; 715/236; 715/237; 715/238; 715/239; 715/240; 715/241; 715/242

(58) Field of Classification Search
USPC ......... 709/227, 228, 229, 232, 233, 234, 235; 370/229, 230, 230.1, 231, 232, 233, 370/234, 235, 237; 704/270.1; 707/770, 707/966–974, 999.01; 715/234–242
See application file for complete search history.

(56) References Cited

U.S. PATENT DOCUMENTS

| 5,613,032 A | 3/1997 | Cruz et al. |
| 5,677,901 A | 10/1997 | Iwamura |

(Continued)

FOREIGN PATENT DOCUMENTS

| CN | 102648464 A | 8/2012 |
| EP | 2483803 | 4/2011 |

(Continued)

OTHER PUBLICATIONS

U.S. Appl. No. 13/088,974, filed Apr. 18, 2011, entitled "System and Method for Providing Augmented Data in a Network Environment," Inventor(s): Satish K. Gannu et al.

(Continued)

*Primary Examiner* — Saket K Daftuar
(74) *Attorney, Agent, or Firm* — Patent Capital Group

(57) ABSTRACT

A method is provided in one example and includes receiving network traffic associated with a first user and a second user; evaluating keywords in the network traffic in order to identify a topic of discussion involving the first and the second users; determining a first sentiment associated with a first data segment associated with the first user; determining a second sentiment associated with a second data segment associated with the second user; and generating an argument map based on the first data sentiment and the second data sentiment.

20 Claims, 7 Drawing Sheets

(56) References Cited

U.S. PATENT DOCUMENTS

| | | | |
|---|---|---|---|
| 5,857,179 A | 1/1999 | Vaithyanathan et al. | |
| 5,961,582 A | 10/1999 | Gaines | |
| 6,012,053 A | 1/2000 | Pant et al. | |
| 6,026,388 A | 2/2000 | Liddy et al. | |
| 6,301,586 B1 | 10/2001 | Yang et al. | |
| 6,304,283 B1 | 10/2001 | Kitagawa | |
| 6,345,253 B1 | 2/2002 | Viswanathan | |
| 6,697,793 B2* | 2/2004 | McGreevy | 1/1 |
| 7,017,183 B1 | 3/2006 | Frey et al. | |
| 7,072,837 B2* | 7/2006 | Kemble et al. | 704/257 |
| 7,099,867 B2* | 8/2006 | Okada et al. | 1/1 |
| 7,260,312 B2 | 8/2007 | Srinivasan et al. | |
| 7,292,532 B2* | 11/2007 | Sakata et al. | 370/230.1 |
| 7,350,227 B2 | 3/2008 | McGrew et al. | |
| 7,417,959 B2 | 8/2008 | Dorner et al. | |
| 7,457,808 B2 | 11/2008 | Gaussier et al. | |
| 7,493,369 B2 | 2/2009 | Horvitz et al. | |
| 7,509,491 B1 | 3/2009 | Wainner et al. | |
| 7,603,350 B1 | 10/2009 | Guha | |
| 7,698,442 B1 | 4/2010 | Krishnamurthy et al. | |
| 7,706,265 B2* | 4/2010 | Monette et al. | 370/230 |
| 7,809,714 B1* | 10/2010 | Smith | 707/713 |
| 7,818,215 B2 | 10/2010 | King et al. | |
| 7,827,191 B2 | 11/2010 | Williams | |
| 7,853,553 B2* | 12/2010 | Lankinen et al. | 707/602 |
| 7,913,176 B1 | 3/2011 | Blattner et al. | |
| 8,015,250 B2 | 9/2011 | Kay | |
| 8,051,204 B2 | 11/2011 | Kai et al. | |
| 8,214,209 B2* | 7/2012 | Nagatomo | 704/235 |
| 8,255,386 B1 | 8/2012 | Annau et al. | |
| 8,260,774 B1* | 9/2012 | Aggarwal | 707/723 |
| 8,374,983 B1 | 2/2013 | Pohl et al. | |
| 2002/0032772 A1 | 3/2002 | Olstad et al. | |
| 2002/0035605 A1 | 3/2002 | McDowell et al. | |
| 2002/0087311 A1 | 7/2002 | Leung Lee et al. | |
| 2002/0093915 A1 | 7/2002 | Larson | |
| 2003/0014399 A1 | 1/2003 | Hansen et al. | |
| 2003/0014448 A1 | 1/2003 | Castellanos et al. | |
| 2003/0014586 A1 | 1/2003 | Mitsuda et al. | |
| 2003/0028773 A1 | 2/2003 | McGarvey et al. | |
| 2003/0028896 A1 | 2/2003 | Swart et al. | |
| 2003/0033288 A1 | 2/2003 | Shanahan et al. | |
| 2003/0074555 A1 | 4/2003 | Fahn et al. | |
| 2003/0093789 A1 | 5/2003 | Zimmerman et al. | |
| 2004/0049714 A1 | 3/2004 | Marples et al. | |
| 2004/0158609 A1 | 8/2004 | Daniell et al. | |
| 2004/0193426 A1 | 9/2004 | Maddux et al. | |
| 2004/0208123 A1* | 10/2004 | Sakata et al. | 370/232 |
| 2004/0258396 A1 | 12/2004 | Nakamura et al. | |
| 2005/0060283 A1 | 3/2005 | Petras et al. | |
| 2005/0063352 A1 | 3/2005 | Amara et al. | |
| 2005/0068167 A1 | 3/2005 | Boyer et al. | |
| 2005/0076198 A1 | 4/2005 | Skomra et al. | |
| 2005/0086197 A1 | 4/2005 | Boubez et al. | |
| 2005/0102522 A1 | 5/2005 | Kanda | |
| 2005/0108001 A1 | 5/2005 | Aarskog | |
| 2005/0160166 A1 | 7/2005 | Kraenzel | |
| 2005/0272405 A1 | 12/2005 | Tomlinson et al. | |
| 2006/0048210 A1 | 3/2006 | Hildre et al. | |
| 2006/0150253 A1 | 7/2006 | Feuerstein et al. | |
| 2006/0168213 A1 | 7/2006 | Richardson et al. | |
| 2006/0224587 A1 | 10/2006 | Zamir et al. | |
| 2006/0285493 A1 | 12/2006 | Manuja et al. | |
| 2007/0016583 A1 | 1/2007 | Lempel et al. | |
| 2007/0106908 A1 | 5/2007 | Miyazaki et al. | |
| 2007/0118275 A1* | 5/2007 | Qi et al. | 701/117 |
| 2007/0198725 A1 | 8/2007 | Morris | |
| 2007/0206617 A1 | 9/2007 | Andreasen et al. | |
| 2007/0239680 A1 | 10/2007 | Oztekin et al. | |
| 2007/0239837 A1* | 10/2007 | Jablokov et al. | 709/206 |
| 2007/0244892 A1* | 10/2007 | Narancic | 707/7 |
| 2007/0253682 A1 | 11/2007 | Chang et al. | |
| 2007/0260684 A1 | 11/2007 | Sharma et al. | |
| 2007/0266020 A1 | 11/2007 | Case et al. | |
| 2007/0294265 A1 | 12/2007 | Askew et al. | |
| 2008/0027981 A1 | 1/2008 | Wahl | |
| 2008/0060055 A1 | 3/2008 | Lau | |
| 2008/0065892 A1 | 3/2008 | Bailey et al. | |
| 2008/0077791 A1 | 3/2008 | Lund et al. | |
| 2008/0091670 A1* | 4/2008 | Ismalon | 707/5 |
| 2008/0097985 A1* | 4/2008 | Olstad et al. | 707/5 |
| 2008/0126690 A1 | 5/2008 | Rajan et al. | |
| 2008/0140674 A1 | 6/2008 | Ishikawa | |
| 2008/0154873 A1 | 6/2008 | Redlich et al. | |
| 2008/0184326 A1 | 7/2008 | Nakajima | |
| 2008/0222142 A1* | 9/2008 | O'Donnell | 707/5 |
| 2008/0244740 A1 | 10/2008 | Hicks et al. | |
| 2008/0295040 A1 | 11/2008 | Crinon | |
| 2008/0313144 A1 | 12/2008 | Huston | |
| 2009/0006333 A1* | 1/2009 | Jones et al. | 707/3 |
| 2009/0049053 A1 | 2/2009 | Barker et al. | |
| 2009/0055175 A1* | 2/2009 | Terrell et al. | 704/235 |
| 2009/0119278 A1 | 5/2009 | Cross et al. | |
| 2009/0182727 A1 | 7/2009 | Majko | |
| 2009/0196570 A1 | 8/2009 | Dudas et al. | |
| 2009/0210715 A1 | 8/2009 | Izu et al. | |
| 2009/0226870 A1 | 9/2009 | Minotti | |
| 2009/0234497 A1 | 9/2009 | Uejo | |
| 2009/0234648 A1* | 9/2009 | Nagatomo | 704/235 |
| 2009/0234834 A1 | 9/2009 | Cozzi | |
| 2009/0254572 A1 | 10/2009 | Redlich et al. | |
| 2009/0276377 A1 | 11/2009 | Dutta et al. | |
| 2009/0293016 A1 | 11/2009 | Potevin et al. | |
| 2009/0319365 A1 | 12/2009 | Waggoner et al. | |
| 2009/0327271 A1 | 12/2009 | Amitay et al. | |
| 2010/0010968 A1 | 1/2010 | Redlich et al. | |
| 2010/0057815 A1 | 3/2010 | Spivack et al. | |
| 2010/0088331 A1 | 4/2010 | White et al. | |
| 2010/0153855 A1* | 6/2010 | Roberts et al. | 715/752 |
| 2010/0179801 A1 | 7/2010 | Huynh et al. | |
| 2010/0223581 A1* | 9/2010 | Manolescu et al. | 715/853 |
| 2010/0223629 A1 | 9/2010 | Appelbaum et al. | |
| 2010/0250547 A1 | 9/2010 | Grefenstette et al. | |
| 2010/0274815 A1 | 10/2010 | Vanasco | |
| 2010/0280985 A1 | 11/2010 | Duchon et al. | |
| 2011/0078167 A1* | 3/2011 | Sundaresan et al. | 707/765 |
| 2011/0078550 A1 | 3/2011 | Nabutovsky | |
| 2011/0093474 A1* | 4/2011 | Etchegoyen | 707/748 |
| 2011/0099195 A1 | 4/2011 | Patwardhan et al. | |
| 2011/0119264 A1 | 5/2011 | Hu et al. | |
| 2011/0161409 A1 | 6/2011 | Nair et al. | |
| 2011/0173260 A1 | 7/2011 | Biehl et al. | |
| 2011/0208522 A1* | 8/2011 | Pereg et al. | 704/235 |
| 2011/0225048 A1* | 9/2011 | Nair | 705/14.66 |
| 2011/0231296 A1 | 9/2011 | Gross et al. | |
| 2011/0252330 A1 | 10/2011 | Catlin et al. | |
| 2011/0270709 A1* | 11/2011 | Lewis et al. | 705/27.1 |
| 2011/0270843 A1 | 11/2011 | Albin | |
| 2011/0304685 A1 | 12/2011 | Khedouri et al. | |
| 2012/0002544 A1* | 1/2012 | Kokku et al. | 370/232 |
| 2012/0030232 A1* | 2/2012 | John et al. | 707/769 |
| 2012/0046936 A1* | 2/2012 | Kandekar et al. | 704/9 |
| 2012/0081506 A1 | 4/2012 | Marvit | |
| 2012/0102050 A1 | 4/2012 | Button et al. | |
| 2012/0110087 A1 | 5/2012 | Culver et al. | |
| 2012/0185239 A1 | 7/2012 | Goud et al. | |
| 2012/0271805 A1 | 10/2012 | Holenstein et al. | |

FOREIGN PATENT DOCUMENTS

| | | |
|---|---|---|
| WO | WO02/42864 | 5/2002 |
| WO | WO02/42940 | 5/2002 |
| WO | WO2011/041443 | 4/2011 |
| WO | WO2012/173780 | 12/2012 |

OTHER PUBLICATIONS

U.S. Appl. No. 13/608,787, filed Sep. 10, 2012 entitled "System and Method for Enhancing Metadata in a Video Processing Environment," Inventor(s) Sandipkumar V. Shah, et al.

Li, Yingbo, et al., "Multi-Video Summarization Based on OB-MMR," EURECOM, Sophia Antipolis, France, Content-Based Multimedia Indexing (CBMI) 2011 9th International Workshop; 6

(56) References Cited

OTHER PUBLICATIONS pages. http://www.eurecom.fr/fr/publication/3365/download/mm-publi-3365.pdf.

Masnick, Mike, "Creating an Automatic Highlight Reel for Sporting Events (Bleeding Edge)," TechDirt lite, Aug. 20, 2003, 2 pages http://www.techdirt.com/article_lite.php?sid=20030820/0042248&pid=17.

Shao, Jian, et al., "Multi-Video Summarization Using Complex Graph Clustering and Mining," Computer Science and Information Systems, vol. 7, No. 1 (2010); 14 pages http://www.doiserbia.nb.rs/img/doi/1820-0214/2010/1820-02141001085S.pdf.

Tian, Ying-li, et al., "IBM Smart Surveillance System (S3): Event Based Video Surveillance System with an Open and Extensible Framework," Special Issue of Machine Vision and Applications Journal, 2008, vol. 19, Issue 5-6, 30 pages http://www.docstoc.com/docs/20141664/IBM-Smart-Surveillance-System-(S3)-Event-Based-Video-Surveillance.

U.S. Appl. No. 12/971,946, filed Dec. 17, 2010 entitled "System and Method for Providing Feeds Based on Activity in a Network Environment:" Inventor(s): Satish K, Gannu et al.

Billi, R., et al., "Interactive Voice Technology at Work: The CSELT Experience," 2nd IEEE Workshop on Interactive Voice Technology for Telecommunications Apptications (IVTTA94); Sep. 26-27, 1994; pp. 43-48; http://ieeexplore.iee.org/stamp/stamp/jsp?arnumber=00341547.

Carnegie Mellon University, "Speech at CMU," 4 pages; printed Sep. 30, 2009; http://www.speech.cs.cmu.edu/speech/.

Caslon Analytics Echelon Note: Overview, May 2006, 6 pages; printed Sep. 30, 2009 http://www.caslon.com.au/echelonnote.htm.

Hess, Andreas et al., "Multi-Value Classification of Very Short Texts," 8 pages, printed on May 12, 2010; http://www.andreas-hess.info/publications/hess-ki08.pdf.

Hess, Andreas, et al., "From Web 2.0 to Semantic Web: A Semi-Automated Approach," 15 pages; printed Sep. 30, 2009; http://www.andreas-hess.info/publications/hess-cisweb08.pdf.

Horvitz, E., et al,, "Coordinate: Probabilistic Forecasting of Presence and Availability," 2002, 10 pages, ftp;//ftp.research.microsoft.com/pub/ejh/coordinate.pdf.

Jadnav, N.S. and I.N. Dwivedi, "Social computing based personal vocabulary building," 5 pages; printed Sep. 30, 2009; http://www.priorartdatabase.com/IPCOM/000173550/.

Kohl, J. and C. Neuman, The Kerberos Network Authentication Service (V5), Network Working Group, RFC 1510, Sep. 1993, 105 pages, http://www.ietf.org/rfc/rfc1510.

Lancope, "Stealth Watch," *Revolutionize the Way You View Your Network,* © 2009, 8 pages http://storage.pardot.com/2382/9637/StealthWatch_System_Family_Brochure.pdf.

Montgomery, W.A., et al., "Network intelligence for Presence Enhanced Communication," SPIRITS Working Group, May 2002, 9 pages, http://ietfreport.isoc.org/all-ids/draft-montgomery-copeland-presence-spirits-00.txt.

Nexidia, "Audio and Speech Analytics Software," 1 page; printed Sep. 30, 2009; http://www.nexidia.com.

Nortel Networks Wireless Solutions (A. Silver, J. Larkins, D. Stringer), "Unified Network Presence Management," A White Paper, © 2000, 6 pages, www.mobilein.com/UNPM.pdf.

NSA Watch, "Other Surveillance Network: Governmental Surveillance Agencies," 2 pages; printed Sep. 30, 2009; http://www.nsawatch.org/networks.html.

Ohl, Ricky, "Computer Supported Argument Visualisation: Modelling Wicked Problems," Ph.D. Thesis, Australian Digital Theses Program, Feb. 2008; 431 pgs,; http://gu.edu.au:8080/adt-root/public/adt-QGU20090724.155249/index.html.

Smith, Ronnie W., "Performance Measures for the Next Generation of Spoken Natural Language Dialog Systems," pp. 37-40; http://acl.ldc.upenn.edu/W/W97/W97-0607.pdf.

Swabey, Pete, "Making the Invisible Visible," 2 pages.; Sep. 23, 2009; http://www.trampolinesystems.com/news/in+the+news/archive/2009/59.

"The LNTS Leap: Phoneme Recognition,"; 2 pages; printed Sep. 30, 2009; http://www.Intstech.com.

Trampoline Systems, "Navigation," 2 pages; printed Sep. 30, 2009; www.trampolinesystems.com.

Trant, Jennifer, "Studying Social Tagging and Folksonomy: A Review and Framework ," Jan. 2009, 10(1) Journal of Digital Information; 42 pages http://dlist.sir.arizona.edu/arizona/handle/10150/105375.

Wasilewska, Anita, CSA 634—Data Mining: Text Mining; 85 pages; www.cs.sunysb.edu/~cse634/presentations/TextMining.pdf.

WebChoir Products—Personal Vocabulary Tools, "Personal Tools," 1 page; printed Sep. 30, 2009 http://www.webchoir.com/products/ptt.html.

Wikipedia, "Homophone," 3 pages; printed Sep. 30, 2009; http://en.wikipedia.org/wiki/Homophone.

Wikipedia, "International Phonetic Alphabet," 19 pages; printed Sep. 30, 2009; http://en.wikipedia.org/wiki/International_Phonetic_Alphabet.

Wikipedia, "Phoneme," 7 pages; printed Sep. 30, 2009; http://en.wikipedia.org/wiki/Phoneme.

U.S. Appl. No. 13/364,102, filed Feb. 1, 2012 entitled "System and Method for Creating Customized On-Demand Video Reports in a Network Environment," Inventor(s): Deepti Patil, et al.

Lacher, Martin S., et al., "On the Integration of Topic Maps and RDF Data," Extreme Markup Languages 2001, 14 pages.

Wang, Xuerui, et al., "Topics over Time: A NonMarkov Continuous Time Model of Topical Trends," KDD'06, Aug. 20-23, 2006, 10 pages.

U.S. Appl. No. 13/160,701, filed Jun. 15, 2011 entitled "System and Method for Discovering Videos," Inventor(s) Ashutosh A. Malegaonkar, et al.

U.S. Appl. No. 13/149,405, filed May 31, 2011 entitled "System and Method for Evaluating Results of a Search Query in a Network Environment," Inventor(s): Satish K. Gannu, et al.

PCT Notification of Transmittal (1 page) of the International Search Report (3 pages), and Written Opinion of the International Searching Authority, or the Declaration (6 pages) mailed Jan. 12, 2011 for PCT/US2010/050762.

Chen, Hsinchun, et al., "A Concept Space Approach to Addressing the Vocabulary Problem in Scientific Information Retrieval: An Experiment on the Worm Community System," Journal of the American Society for Information Science Wiley for Asis USA, vol. 48, No. 1, Jan. 1997, XP002614340, ISSN: 0002-8231; pp. 17-31.

Chen, Rung-Ching, et al., "Adding New Concepts on the Domain on the Domain Ontology Based on Semantic Similarity," International Conference on Business and Information, Jul. 12-14, 2006, XP002614339; 14 pages; http://bai2006.atisr.org/CD/Papers/2006bai6169.pdf.

Sethy, Abhinav, et al., "Building Topic Specific Language Models from Webdata Using Competitive Models," 9th European Conference on Speech Communication and Technology, Eurospeech interspeech 2005 International Speech and Communication Association Fr., 2005, pp. 1293-1296; XP 002614341; http://sail.usc.edu/publications/sethy-euro2005.pdf.

U.S. Appl. No. 13/098,112, filed Apr. 29, 2011 entitled "System and Method for Evaluating Visual Worthiness of Video Data in a Network Environment", inventor(s): Deepti Patil et al.

U.S. Appl. No. 13/098,434, filed Apr. 30, 2011 entitled "System and Method for Media Intelligent Recording in a Network Environment", Inventor(s): Ashutosh A. Malegaonkar et al.

Virage, "Audio Analysis," Autonomy Virage, © 2009 Autonomy, Virage, 1 page http://www.virage.com/security-and-surveillance/functions/audio-analysis/index.htm.

Virage, "Understanding Video," Autonomy Virage, © 2009 Autonomy Virage, 5 pages http://www.virage.com/rich-media/technology/understanding-video/index.htm.

Seher, Indra, "Query Expansion in Personal Queries," IADIAS (International Association for Development of the Information Society) 2006, 5 pages www.iadis.org/Multi2006/papers/16/5023_ISA.

Jiang, Weiliang, et al., "A Method for Personal Query Based on Role Preference Ontology," Industrial Mechanatronics and Automation, ICIMA 2009 International Conference, pp. 479-481; Abstract Only, 1 page.

(56) References Cited

OTHER PUBLICATIONS

U.S. Appl. No. 13/182,862, filed Jul. 14, 2011 entitled "System and Method for Deriving User Expertise Based on Data Propagating in a Network Environment," Inventor(s): Satish K. Gannu, et al.
Rosella Data Mining & Database Analytics, "Web Search and Web Navigation Pattern Analyzer," 3 pages; printed Jul. 25, 2011; http://222.roseiladb.com/surf-pattern-analyzer.htm.
U.S. Appl. No. 12/571,390, filed Sep. 30, 2009, entitled "System and Method for Generating Vocabulary From Network Data," Inventor(s): Thangavelu Arumugam, et al.
U.S. Appl. No. 12/471,404, filed Sep. 30, 2009, entitled "System and Method for Generating Personal Vocabulary from Network Data," Inventor(s): Satish K. Gannu, et al.
U.S. Appl. No. 12/571,414, filed Sep. 30, 2009, entitled "System and Method for Providing Speech Recognition Using Personal Vocabulary in a Network Environment," Inventor(s): Satish K. Gannu, et al.
U.S. Appl. No. 12/571,421, filed Sep. 30, 2009, entitled "System and Method for Ensuring Privacy While Tagging Information in a Network Environment," Inventor(s): Satish K. Gannu, et al.
U.S. Appl. No. 12/571,426, filed Sep. 30, 2009, entitled "System and Method for Controlling an Exchange of Information in a Network Environment," Inventor(s): Satish K. Gannu, et al.
U.S. Appl. No. 12/762,194, filed Apr. 16, 2010, entitled "System and Method for Deducing Presence Status from Network Data," Inventor(s): Thangavelu Arumugam, et al.
U.S. Appl. No. 12/778,899, filed May 12, 2010, entitled "System and Method for Deriving User Expertise Based on Data Propagating in a Network Environment," Inventor(s): Virgil N. Mihailovici, et al.
U.S. Appl. No. 12/475,486, filed Jun. 3, 2009, entitled "Authentication via Monitoring," Inventor(s): David McGrew and Sandeep Rao.
Grimes, Seth, "Sentiment Analysis: Opportunities and Challenges," Beye Network; Jan. 22, 2008; 6 pages; http://www.b-eye-network.com/view/6744.
iLogos v1.5 download (win); 4 pages. [Retrieved and printed on May 28, 2010] from http://www.phil.cmu.edu/projects/argument_mapping/.
Maybury, Mark et al., "Enterprise Expert and Knowledge Discovery," MITRE Technical Papers, The MITRE Corporation, Sep. 2000, 11 pages; http://www.mitre.org/work/tech_papers/tech_papers_00/maybury_enterprise/maybury_enterprise.pdf.
Moorthi, Y. L. R., "Have Breakfast or Be Breakfast," Wall Street Journal, Feb. 8, 2010, 2 pages; http://online.wsj.com/article/SB126465641868236415.html#printMode.
Oliveira, Bruno et al., "Automatic Tag Suggestion Based on Resource Contents," Knowledge Engineering: Practice and Patterns, Lecture Notes in Computer Science, 2008, vol. 5268/2008, DOI: 10.1007/978-3-54 [Abstract Only, 1 page]; http://www.springerlink.com/content/008w50405265r177/.
"Click Scoring Relevance Framework," LucidWorks, 7 pages [retrieved and printed May 7, 2012] http://lucidworks.lucidimagination.com/display/lweug/Click+Scoring+Relevance+Framework.

"Google Custom Search," Web Page, Google.com, © 2012 Google, 1 page http://www.google.com/cse/.
"Recommender System," Wikipedia, Apr. 28, 2012; 9 pages http://en.wikipedia.org/wiki/Recommender_system.
"Umbrich J., et al., ""Four Heuristics to Guide Structured Content Crawling,"" Eighth International Conference on WEB Engineering, 2008, Jul. 14, 2008; © 2008 IEEE DOI 10.1109/ICWE.2008.42".
"Understanding Metadata," NISO Press, National Information Standards Organization, 2004, 20 pages.
"Wang, Feng, et al., ""Multi-Document Video Summarization,"" ICME 2009, IEEE International Conference on Multimedia and Expo, 4 pages http://www.eurecom.fr/fr/publication/2751/download/mm-publi-2751.pdf".
Bollen, et al., "Usage Derived Recommendations for a Video Digital Library," Journal of Network and Computer Applications, Academic Press, New York, NY, vol. 30, No. 3, Mar. 16, 2007.
Dang, et al., "Learning to Rank Query Reformulations," Proceedings of the 33rd Annual International ACM SIGIR Conference, SIGIR'10, Jul. 19-23, 2010, Geneva, Switzerland (2010); 2 pages.
EPO Nov. 7, 2012 Response to Communication pursuant to Rule 161(1) and 162 from European Application No. 10770664; 8 pages.
Filippova, et al., Improved Video Categorization from Text Metadata and User Comments, Proceedings of the 34th Annual International ACM SIGIR Conference, SIGIR'11, Jul. 24-28, 2011, Beijing, China (2011); 8 pages.
Gligorov, User-generated Metadata in Audio-visual Collections, Proceedings of the International World Wide Web Conference, WWW 2012, Apr. 16-20, 2012, Lyon, France (2012); 5 pages.
Harry, David, "The SEO Guide to Google Personalized Search," The Fire Horse Trail, SEO and Marketing Blog, Dec. 7, 2009, 9 pages http://www.huomah.com/Search-Engines/Search-Engine-Optimization/The-SEO-Guide-to-Google-Personalized-Search.html.
Jain, et al., "Learning to Re-Rank: Query-Dependent Image Re-Ranking Using Click Data," Proceedings of the International World Wide Web Conference, WWW 2011, Mar. 28-Apr. 1, 2011, Hyderabad, India (2011); 10 pages.
PCT Oct. 4, 2012 Notification of Transmittal of the International Search Report and Written Opinion of the International Search Authority from Application PCT/US2012/040097; 15 pages.
PCT Apr. 3, 2012 International Preliminary Report on Patentability and Wrtten Opinion of the International Searching Authority from International Application PCT/US2010/050762; 7 pages.
Rodriguez, et al. Automatic Metadata Generation Using Associative Networks, ACM Transactions on Information Systems, vol. 27, No. 2, Article 7, Feb. 2009.
Telestream, Inc. Product Literature, "Extracting and Preparing Metadata to Make Video Files Searchable," Telestream, Inc. 2008; 6 pages.
Umbrich J., et al., ""Four Heuristics to Guide Structured Content Crawling,"" Eighth International Conference on WEB Engineering, 2008, Jul. 14, 2008; © 2008 IEEE DOI 10.1109/ICWE.2008.42.

\* cited by examiner

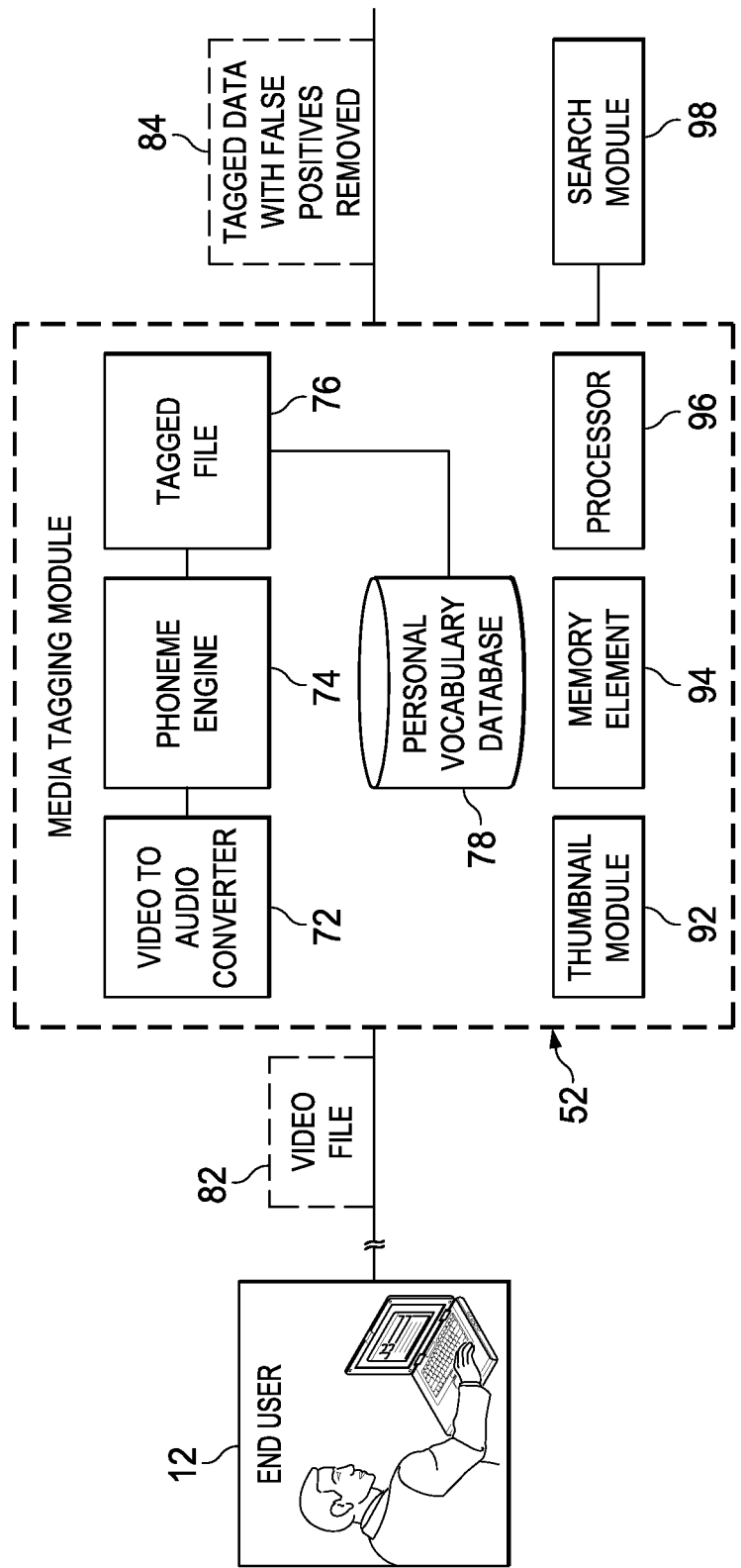

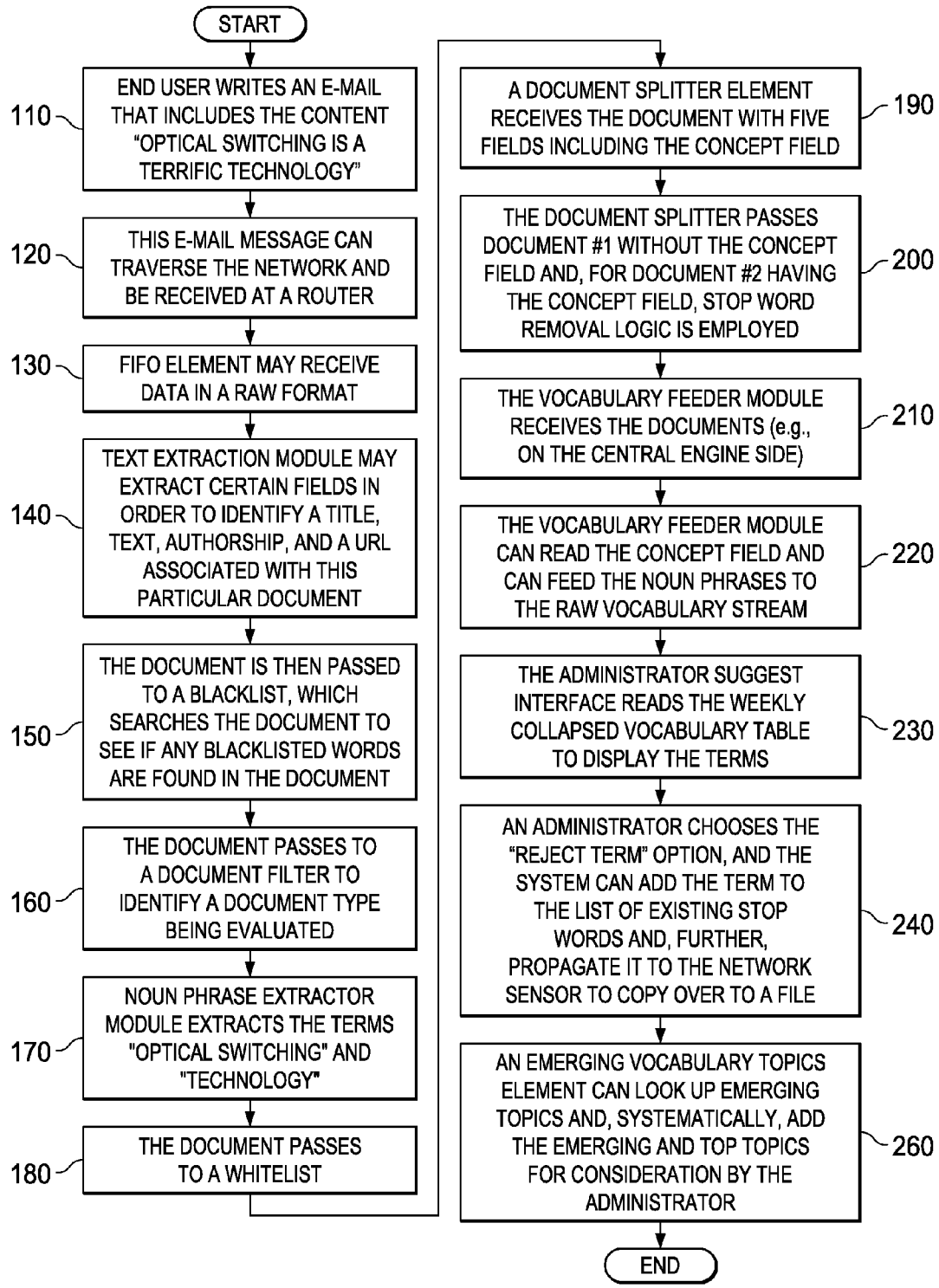

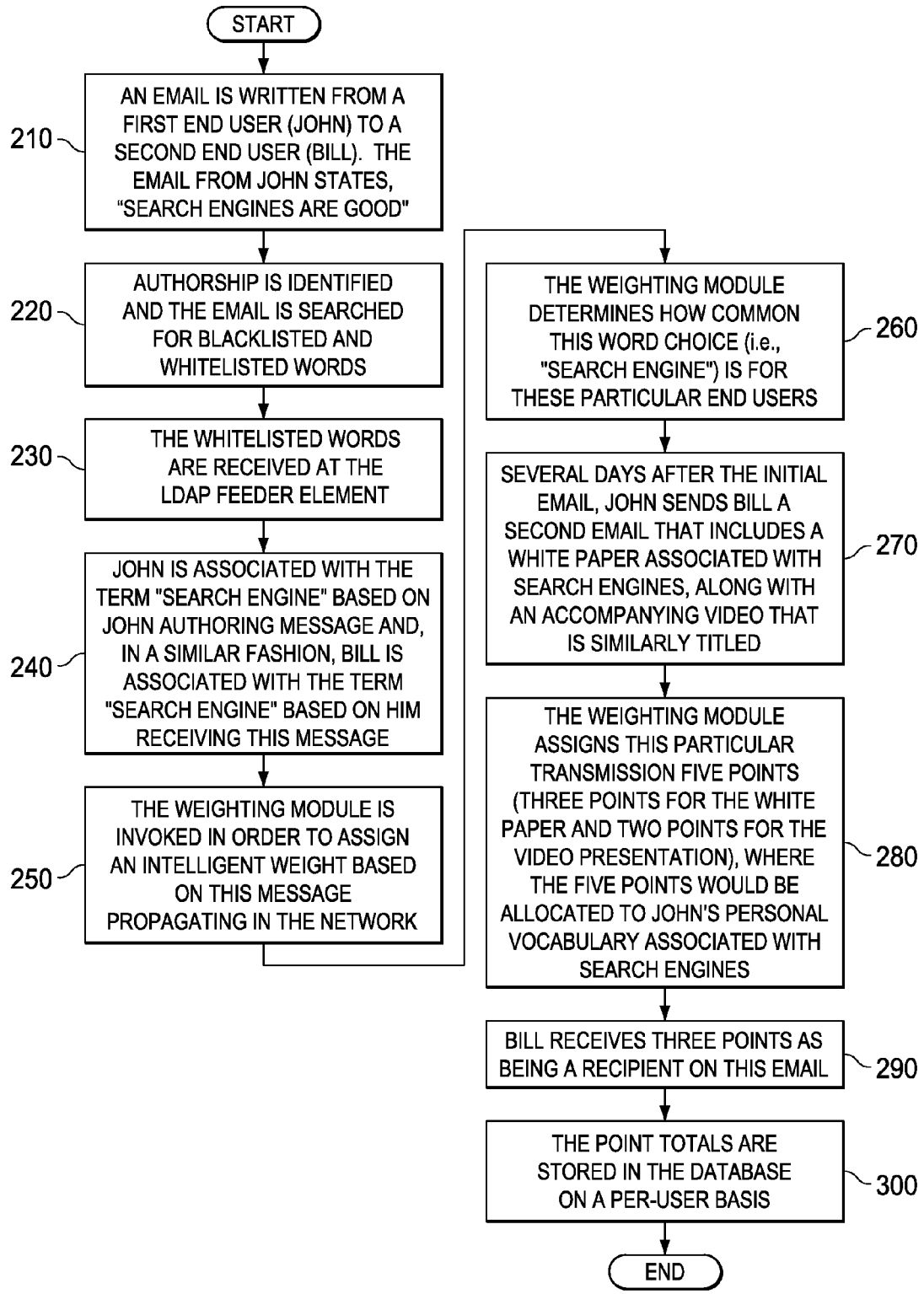

SYSTEM AND METHOD FOR PROVIDING ARGUMENT MAPS BASED ON ACTIVITY IN A NETWORK ENVIRONMENT

TECHNICAL FIELD

This disclosure relates in general to the field of communications and, more particularly, to providing argument maps based on activity in a network environment.

BACKGROUND

The field of communications has become increasingly important in today's society. In particular, the ability to effectively gather, associate, and organize information presents a significant obstacle for component manufacturers, system designers, and network operators. Argument maps are generally difficult to develop, as an individual typically has to manually input and attempt to summarize information associated with a recent information exchange. Commonly, argument maps fail to include different mediums of communication. As new communication platforms and technologies become available, new protocols should be developed in order to optimize the use of these emerging protocols.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 1E is a simplified block diagram of a media tagging module in the communication system in accordance with one embodiment;

FIG. 3 is a simplified flowchart illustrating a series of example steps associated with the communication system; and FIG. 4 is a simplified flowchart illustrating another series of example steps associated with the communication system.

DETAILED DESCRIPTION OF EXAMPLE EMBODIMENTS

Overview

A method is provided in one example and includes receiving network traffic associated with a first user and a second user; evaluating keywords in the network traffic in order to identify a topic of discussion involving the first and the second users; determining a first sentiment associated with a first data segment associated with the first user; determining a second sentiment associated with a second data segment associated with the second user; and generating an argument map based on the first data sentiment and the second data sentiment.

In other embodiments, the method can include converting a portion of the network traffic from a speech format to a text format in order to determine the first sentiment and the second sentiment. The argument map can be delivered to the first user and the second user as a result of a discussion terminating between the first user and the second user. The network traffic and include email data, media data, video data, audio data, etc. The email header information and signatures can be removed before determining the first sentiment and the second sentiment. In more specific instances, timestamps and Internet Protocol (IP) addresses associated with the first user and the second user are identified. Furthermore, an interaction associated with the topic of discussion is chronologically ordered before determining the first sentiment and the second sentiment.

Example Embodiments

Figure 1A:
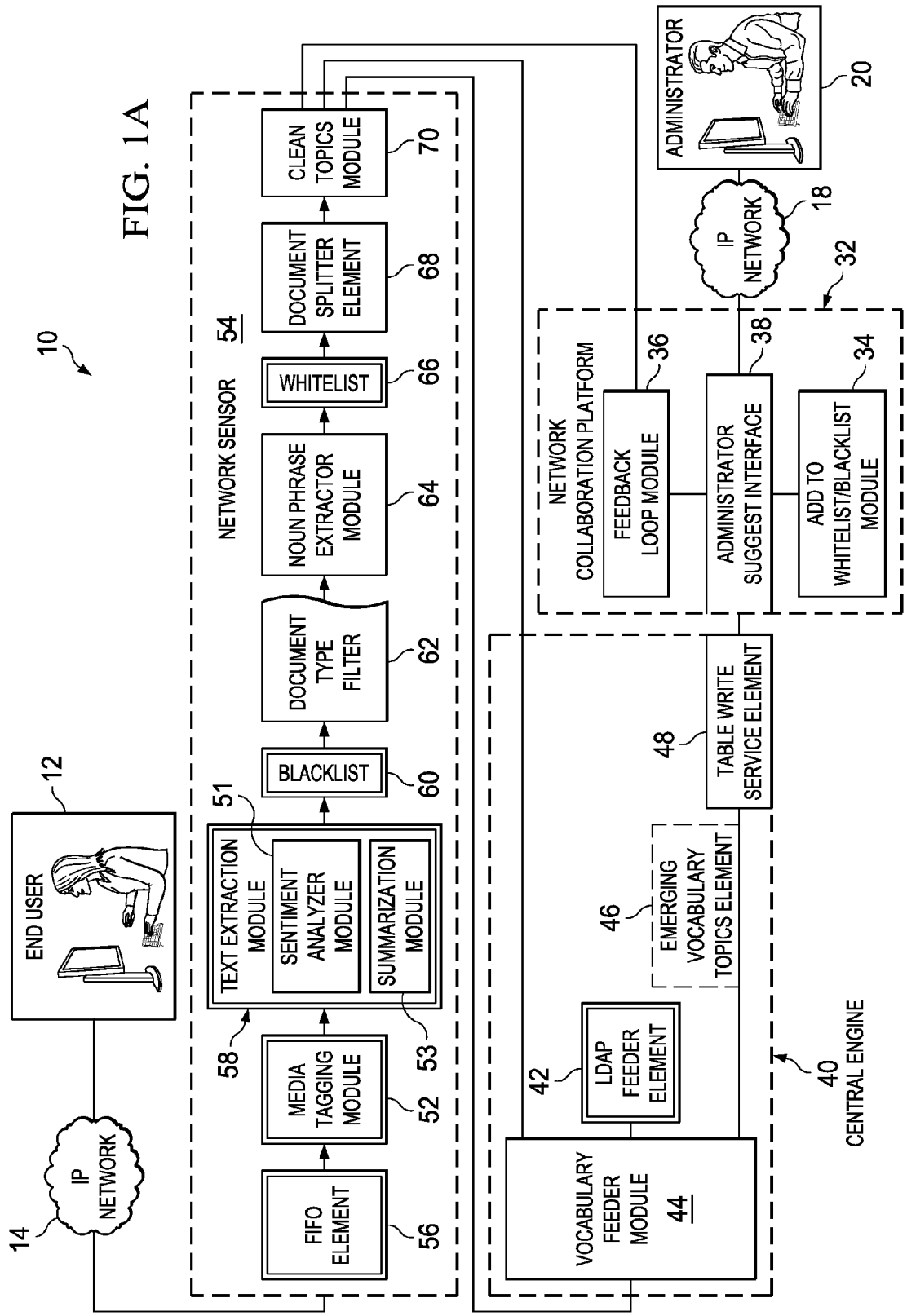
FIG. 1A is a simplified block diagram of a communication system for providing argument maps based on network activity in accordance with one embodiment.

FIG. 1A is a simplified block diagram of a communication system 10 for developing intelligent argument maps based on network data. FIG. 1A may include an end user 12, who is operating a computer device that is configured to interface with an Internet Protocol (IP) network 14. In addition, an administrator 20 is provided, where administrator 20 has the ability to interface with the architecture through an IP network 18. Communication system 10 may further include a network collaboration platform (NCP) 32, which includes an add to whitelist/blacklist module 34, a feedback loop module 36, and an administrator suggest interface 38. Network Sensor 54 also includes a sentiment analyzer module 51 and a summarization module 53, which in this particular example are provisioned along with text extraction module 58. Alternatively, these modules may be provisioned elsewhere based on particular configuration needs. FIG. 1A may also include a central engine 40, which includes a lightweight directory access protocol (LDAP) feeder element 42, a vocabulary feeder module 44, an emerging vocabulary topics element 46, and a table write service element 48.

FIG. 1A may also include a network sensor 54 that includes a first in, first out (FIFO) element 56, a media tagging module 52, a text extraction module 58, a blacklist 60, a document type filter 62, a noun phrase extractor module 64, a whitelist 66, a document splitter element 68, and a clean topics module 70. Multiple network sensors 54 may be provisioned at various places within the network and such provisioning may be based on how much information is sought to be tagged, the capacity of various network elements, etc.

In accordance with certain embodiments, communication system 10 can create clarity and foster progress by developing argument maps associated with network activity. The argument map can be provided as a graphical representation, as a text document, as a diagram (inclusive of video images), or provided in any other suitable format (e.g., rendered on a user interface). Communication system 10 is configured to systematically review speech, text, media, etc. in order to develop argument maps that effectively summarize interactions amongst individuals. For example, there could be an email exchange on an email list (e.g., a particular business unit) amongst individuals. Those emails can be analyzed for keywords, sentiment, etc. in order to develop an appropriate argument map that effectively summarizes the discussions. More specifically, communication system 10 can identify the topic of discussion, the keywords used in the discussion, and the resultant opinions of those discussions (e.g., for/against a particular concept). The keywords can be suitably mapped back to each individual user to further develop their personal vocabulary.

Logistically, sentiment analyzer module 51 is configured to track certain words in order to determine sentiment. For example, the phrase "I don't like" can be readily identified as a negative sentiment. Similarly, the phrase "I really enjoyed" can be tagged as a positive sentiment. Additionally, there are degrees of sentiment such that the phrase "I absolutely hate" can be readily identified as a strong negative sentiment, whereas the phrase "I truly love" can be identified as a strong positive sentiment. As used herein in this Specification, the term 'sentiment' is meant to include any type of feeling, opinion, statement, reaction, or expression associated with a given topic.

Before turning to additional operational capabilities of communication system 10, certain foundational information is provided in order to elucidate some of the problematic areas associated with argument map activities. An argument map is a visual representation of the structure of an argument in informal logic. The argument map can include the components of an argument such as main contentions, premises, co-premises, objections, rebuttals, and lemmas. Typically, an argument map is a "box and arrow" diagram with boxes corresponding to propositions, and arrows corresponding to relationships (e.g., evidential support). Argument mapping is often designed to support deliberation over issues, ideas, and arguments. Furthermore, argument maps can support the analysis of pros and cons when deliberating over difficult business problems.

Current argument mapping is entirely dependent on user inputs and the format of these inputs. Manual argument mapping is time-consuming, and it has consistently proved to be inaccurate and/or biased. In employment scenarios, workers attend numerous meetings, conduct discussions with their colleagues, and constantly write emails to each other. Hence, there are various forms of communication mediums in which individuals participate. In this context, it is difficult to track the primary topic and, further, to focus on the crucial points associated with the given problem. Argument maps improve critical thinking by providing clarity of thought (visual displays), uncover hidden assumptions, and effectively evaluate strong and weak links.

Communication system 10 is configured to capture various forms of communication mediums (as data segment inputs) in order to efficiently provide argument maps. As part of this processing, the platform can identify the primary topic of discussion, the participants, the sentiment, and generate a suitable resultant (e.g., a discrete conclusion, an argument map, etc.). Note that to effectively address face-to-face and virtual meetings (e.g., Telepresence, WebEx, etc.) communication system 10 can leverage speech-to-text conversion technology, along with video tagging.

Semantically, once the appropriate data has been captured from various forms of corporate communication, basic and complex text analysis can be executed. For example, a semantic analysis, noun-phrase extraction analysis, or a verb-phrase extraction can enable the platform to shortlist potential topics of discussion. In one particular example, occurrence counters can be used (potentially provided along with smart weights) to better identify the most probable topic being evaluated. Furthermore, the sentiment analysis can include classifying the polarity of a data segment in a given document, a sentence, an expressed opinion (which may be provided in audio, video, media) as positive, negative, or neutral. Further, these sentiments can have varying degrees such as 'strong negative', 'strong positive', etc. The generated argument maps can be suitably displayed to a user interface (e.g., when the a text analysis detects a conclusion in the conversation).

Note that communication system 10 eliminates the cumbersome task of manual entry for generating argument maps. The platform develops the argument maps based on incoming data, where the process can routinely occur while individuals are participating in their daily employment activities. Additionally, any potential bias is eliminated in forming the argument map, as there is no human intervention in generating the map. Separately, the argument mapping is predictable, produced quickly, and readily available to any interested/authorized party.

Figure 1B:
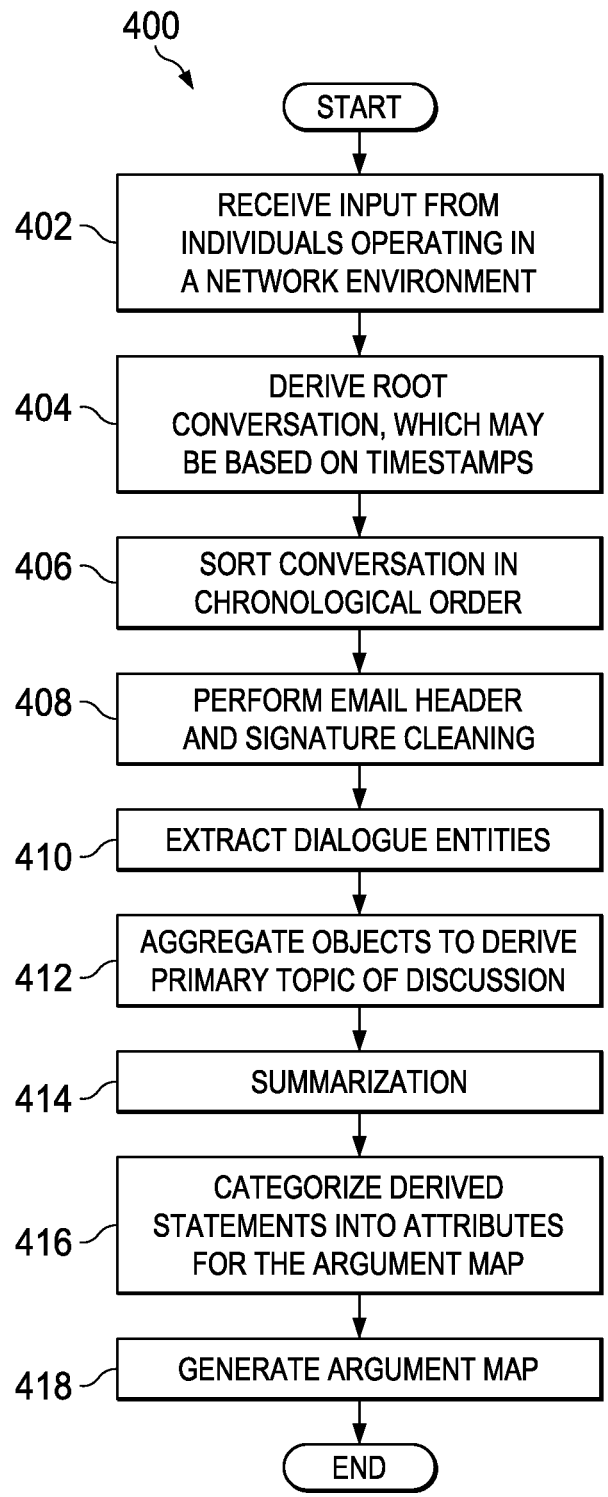
FIG. 1B is a simplified flowchart illustrating one possible activity associated with providing argument maps in accordance with one embodiment.

Turning to FIG. 1B, FIG. 1B is a simplified flowchart 400 illustrating one potential example associated with communication system 10. This particular operation may begin at 402, where input is received from individuals who may be operating in a network environment. Note that communication system 10 is not confined to a network environment; however, most employment scenarios involve tracking emails, documents, video conferences, audio calls, etc., where all of these possibilities can be included as being part of a network environment. At 404, the root conversation is derived, which may be based on timestamps. This activity could include deriving the origin of dialogue between any number of individuals (e.g., identifying their respective IP addresses).

At 406, the conversation can be sorted in chronological order, while at step 408, email header and signature cleaning can be performed. Note that if the system is dealing with a speech transcript, this step may be skipped entirely. At 410, dialogue entities are extracted, where sentiment scores can also be developed. At 412, objects can be aggregated in order to derive a primary topic of discussion. At 414, summarization activities can occur in order to extract the parts of data/speech, which have the top entities embedded in them. At 416, a categorization occurs for the derived statements with respect to the argument map attributes (e.g., the main contention, premises, co-premises, objections, rebuttals, and lemmas). Part of these activities may involve speech recognition, sentiment analyses, basic linguistic models, etc. At 418, the argument map is suitably generated and provided to any suitable/authorized individual.

Figure 1C:
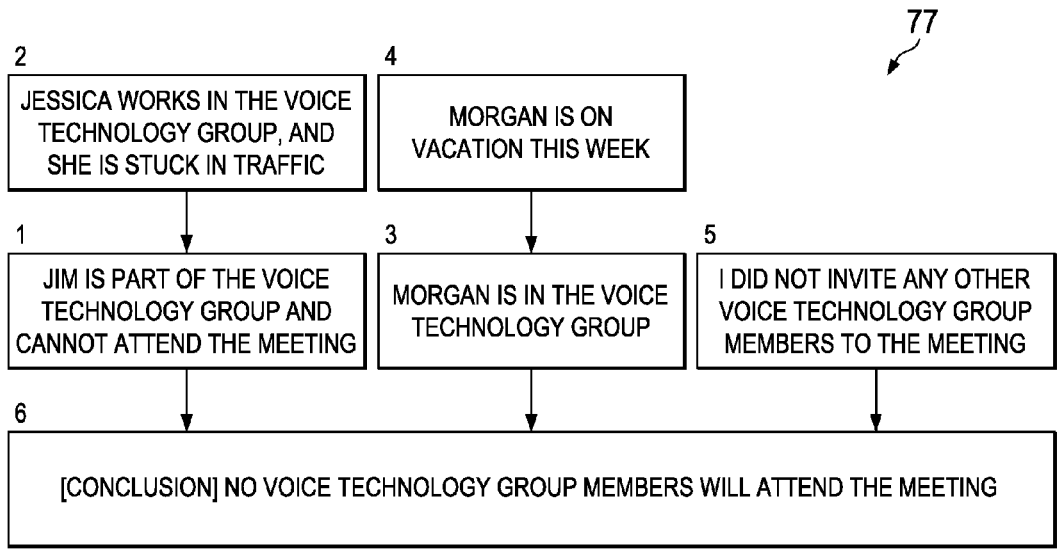
FIG. 1C is a simplified schematic illustrating example statements and an argument mapping associated with one embodiment of the present disclosure.

FIG. 1C is a simplified schematic diagram 77 illustrating an example argument map developed and processed by communication system 10. In this particular example, six statements are used to develop an appropriate argument map. The six statements are provided as: 1) Jim is part of the voice technology group and cannot attend the meeting; 2) Jessica works in the voice technology group, and she is stuck in traffic; 3) Morgan is in the voice technology group; 4) Morgan is on vacation this week; 5) I did not invite any other voice technology group members to the meeting; 6) [Conclusion] No voice technology group members will attend the meeting. Note that such a conclusion can be provided in a text format, an audio format, a video format, an email format, or in any other suitable format, which may be based on particular preferences or configuration needs.

Consider another example in which an email discussion can be used to derive automated argument maps to enable logic and clarity in the arguments. Step one would involve deriving the root email and then ordering the emails chronologically. The second step would involve extracting the email subject/title, which in this particular example is provided as "A Good Read." The third step involves performing any type of email header and signature cleaning (i.e., removal). The fourth step involves identifying entities, and the appropriate sentiment for each email document. The entities in such a case can be associated with people, places, products, companies, or any other appropriate object. The sentiment can be produced as a numerical value that aligns with some type of formulated scale. For example, a sentiment between 0.4-0.6 represents a positive sentiment, whereas anything above 0.6 would represent a strong positive sentiment for that particular statement, document, email, etc. Similarly, any sentiment between −0.1 and +0.1 can be regarded as neutral.

Subsequently, the entity counts can be tallied, where the data would be suitably aggregated in order to identify the primary topic of discussion. Note that there could be secondary topics of discussion that are similarly identified. Once this is completed, the summarization may be performed in order to derive a set of statements. Summarization can be based on extracting sentences that include the top two entities in this particular example. After this is completed, the argument statements may be derived, which may include the components of an argument such as main contentions, premises, co-premises, objections, rebuttals, and lemmas. The final step would include generating a suitable argument map, which may also provide a suitable conclusion(s) for any interested party to review. Note that default settings in certain network scenarios can involve systematically developing these argument maps once a given session (e.g., video session, audio session, Telepresence session, WebEx session, email session) has finished.

Turning to the infrastructure of FIG. 1A, IP networks 14 and 18 represent a series of points or nodes of interconnected communication paths for receiving and transmitting packets of information, which propagate through communication system 10. IP networks 14 and 18 offer a communicative interface between servers (and/or end users) and may be any local area network (LAN), a wireless LAN (WLAN), a metropolitan area network (MAN), a virtual LAN (VLAN), a virtual private network (VPN), a wide area network (WAN), or any other appropriate architecture or system that facilitates communications in a network environment. IP networks 14 and 18 can implement a TCP/IP communication language protocol in a particular embodiment of the present disclosure; however, IP networks 14 and 18 may alternatively implement any other suitable communication protocol for transmitting and receiving data packets within communication system 10.

Note that the elements of FIG. 1A-1B can readily be part of a server in certain embodiments of this architecture. In one example implementation, network sensor 54, central engine 40, and/or NCP 32 are (or are part of) network elements that facilitate or otherwise helps coordinate the argument map operations, as explained herein. As used herein in this Specification, the term 'network element' is meant to encompass network appliances, servers, routers, switches, gateways, bridges, loadbalancers, firewalls, processors, modules, or any other suitable device, proprietary component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information. Note that each of network sensor 54, central engine 40, and/or NCP 32 can be provisioned with their own dedicated processors and memory elements (not shown), or alternatively the processors and memory elements may be shared by network sensor 54, central engine 40, and NCP 32.

In one example implementation, network sensor 54 includes software (e.g., as part of text extraction module 58, sentiment analyzer module 51, summarization module 53, etc.) to achieve the argument map operations, as outlined herein in this document. In other embodiments, this feature may be provided externally to any of the aforementioned elements, or included in some other network device to achieve this intended functionality. Alternatively, several elements may include software (or reciprocating software) that can coordinate in order to achieve the operations, as outlined herein. In still other embodiments, any of the devices of FIG. 1A may include any suitable algorithms, hardware, software, components, modules, interfaces, or objects that facilitate these argument building operations. Additional operational capabilities of communication system 10 are detailed below.

Turning to the formulation of the personal vocabulary, it should be noted that in generating a large corpus of vocabulary words, one issue arises due to false positives. For example, the words "meet" and "meat" shared the same phonetics. If an architecture fails to account for these significant phonetics, then data collection, processing, and searching can ultimately be inaccurate. For example, when a new search is performed on each of these terms identified above, both terms could yield a large number of results. However, if the person who issued the query is interested in finding information (or people) related to some type of 'meet'-ing protocol (e.g., in the context of WebEx technology), then those search results are targeting a specific usage of the term "meet." Results that are returned and that include the term "meat" are irrelevant for this particular search. Additionally, the person who received the inaccurate results is forced to sort through these irrelevant terms.

Communication system 10 can offer an intelligent filtering of words by leveraging the personal vocabulary of the individual who is associated with the collected data. The personal vocabulary can be developed in a different workflow, where the elimination of false positives represents an application of that personal vocabulary against an incoming media file. For example, as the system processes new end user media files (e.g., video, audio, any combination of audio/video, etc.), an additional layer of filtering can be performed that checks the collected (or tagged) terms against personal vocabulary. Thus, if a particular end user has a personal vocabulary that includes the term "meet", then as media files are identifying phonetically accurate words (e.g., "meet", "meat") in the audio track, the extraneous term (i.e., "meat") would be eliminated as being a false positive. Note that the probability of a personal vocabulary having two words that phonetically sound the same is low. This factor can be used in order to remove a number of false positives from information that is collected and sought to be tagged. This engenders a higher quality of phoneme-based speech recognition. Hence, the personal vocabulary can be used to increase the accuracy of terms tagged in media file scenarios.

In one general sense, an application can be written on top of the formation of an intelligent personal vocabulary database. A partitioned personal vocabulary database can be leveraged in order to further enhance accuracy associated with incoming media files (subject to tagging) to remove false positives that occur in the incoming data. Thus, the media tagging activity is making use of the personal vocabulary (which is systematically developed), to refine phoneme tagging.

The personal vocabulary developed by communication system 10 can be used to augment the tagging results associated with video or audio files. Phoneme technology breaks down speech (for example, from analog to digital, voice segmenting, etc.) in order to provide text, which is based on the media file. For example, as a video file enters into the system, the objective is to capture relevant enterprise terms to be stored in some appropriate location. The repository that stores this resultant data can be searched for terms based on a search query. Phonetic based audio technology offers a mechanism that is amenable to audio mining activities. A phonetic-index can be created for every audio file that is to be mined. Searches can readily be performed on these phonetic indices, where the search terms could be free form.

In one example, an end user can upload a video file onto the system. Enterprise vocabulary can be tagged for this particular video file (e.g., using various audio-to-text operations). The resulting enterprise vocabulary can be confirmed based on that particular end user's personal vocabulary, which has already been amassed. For example, if an original tagging operation generated 100 tags for the uploaded video file, by applying the personal vocabulary check, the resulting tags may be reduced to 60 tags. These resulting 60 tags are more accurate, more significant, and reflect the removal of false positives from the collection of words. Additional details related to media tagging module 52 are provided below with reference to the FIGURES. Before turning to those details, some primary information is offered related to how the underlying personal vocabulary is constructed and developed.

Communication system 10 can intelligently harvest network data from a variety of end users, and automatically create personal vocabulary from business vocabulary by observing each user's interaction/traffic on the network. In a general sense, the architecture can isolate terms per person in order to define an end user's personal vocabulary. This information can subsequently be used to identify specific experts. In other instances, the personal vocabulary can be used for topic-based social graph building (e.g., social networking applications). In other instances, this information can be used to improve the accuracy of speech-to-text translations, which can relate to the individual applications being used by the person, a particular environment in which the end user participates, feature invocation applications, etc. The solution can intelligently and dynamically auto generate different lists of personal vocabulary per user without creating additional overhead for the end users.

As part of its personal vocabulary development activities, communication system 10 can tag words for specific end users. For example, relevant words identified in an enterprise system can be extracted from the documents, which are flowing through the network. The tags can be categorized and then associated to the user, who generated or who consumed each document. In accordance with one example implementation, a tag can be given different weights depending on several potential document characteristics. One characteristic relates to the type of document propagating in the network (for example, email, an HTTP transaction, a PDF, a Word document, a text message, an instant message, etc.). Another characteristic relates to the type of usage being exhibited by the end user. For example, the system can evaluate if the end user represents the producer of the content (e.g., the sender, the poster, etc.), or the consumer of the content (e.g., the recipient, the audience member, etc.). In one example, if the end user were posting a document including the identified vocabulary, the act of posting such words would accord the words a higher weight, than merely receiving an email that includes the particular vocabulary words. Stated in different terms, in a forum in which the end user is authoring a document to be posted (e.g., on a blog, on a corporate website, in a corporate engineering forum, etc.), vocabulary words within that document would have a higher associative value than if the words were propagating in lesser forums (e.g., a passive recipient in an email forum). Yet another characteristic relates to a probability of a term showing up in a document. (Note that multiple word terms have a lower probability of occurrence and, therefore, carry a higher weight when they are identified). In one instance, the tagged vocabulary words can be aggregated using streaming databases, where the aggregated tags can be stored and archived in a summarized format.

The resulting information may be suitably categorized in any appropriate format. For example, a dynamic database (e.g., table, list, etc.) can be generated for each individual user, each user-to-user communication (e.g., 1-1, N or N, etc.), and each type of document (e.g., email, phone conversation messages, Meeting Place meeting data, WebEx data, blog posting, White Paper, PDF, Word document, video file, audio file, text message, etc.). Essentially, any type of information propagating in the network can be suitably categorized in the corresponding database of the tendered architecture. Some of the possible database configurations are described below with reference to FIG. 2.

It should be noted that there are several different types of objects flowing through the architecture of communication system 10. Components within communication system 10 can identify which objects should be processed by particular components of the configuration. One set of objects relates to media files. These can be received by FIFO element 56 and subsequently passed to media tagging module 52. The resultants (from processing, which occurs at media tagging module 52) is then passed to text extraction module 58.

In operation of an example that is illustrative of business vocabulary being developed, at vocabulary feeder module 44, data can be sent by noun phrase extractor module 64, (i.e., the content field) and this can be used for vocabulary suggestion for administrator 20. This data can be anonymous, having no user concept. For LDAP feeder element 42, whitelisted terms are provided and, further, this can be used for personal vocabulary building, as discussed herein. In essence, this data belongs to a particular user; it is a document associated to a user. Thus, there are two distinct workflows occurring in the architecture, which processes different types of documents for different purposes.

For the business vocabulary workflow, one aspect of the architecture involves a noun phrase extraction component, which can be provided along with filtering mechanisms, and stream access counts to retrieve popular and/or new vocabulary terms. In one example implementation, involving the development of business vocabulary, the architecture can suggest words and phrases that are potential vocabulary candidates. Multi-word phrases can be given more weight than single word terms. The decision whether to include these words in the whitelist or the blacklist can rest with the vocabulary administrator. The administrator can also decide if the words should never be brought to his attention again by marking them for addition to the list of administrator stop words. This can take the form of a feedback loop, for example, from the NCP user interface to the network sensor/central engine (depending on where the stop word removal component may reside).

In one example embodiment, only a certain domain of data (e.g., words) of vocabulary is tagged. As used herein in this Specification, the term 'data' is meant to encompass any information (video, text, audio, multimedia, voice, etc.) in any suitable format that propagates in a network environment. The particular domain could be provided in a whitelist, which reflects specific network content. In one example implementation, administrator 20 can develop a certain domain that respects privacy issues, privileged content, etc. such that the ultimate composite of documents or files would reflect information capable of being shared amongst employees in a corporate (potentially public) environment. In certain implementations, the resultant composite of documents (i.e., data) can help to identify experts associated with specific subject matter areas; however, there are a myriad of additional uses to which communication system 10 can apply. As used herein in this Specification, the term 'resultant composite' can be any object, location, database, repository, server, file, table, etc. that can offer administrator 20 the results generated by communication system 10.

Figure 1D:
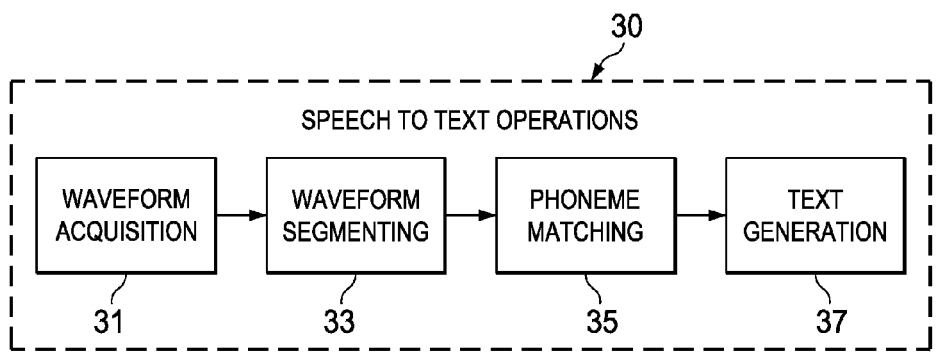
FIG. 1D is a simplified schematic diagram of speech-to-text operations that can be performed in the communication system in accordance with one embodiment.

Turning to FIG. 1D, FIG. 1D is a simplified schematic diagram illustrating a number of speech-to-text operations 30 that may occur within communication system 10. FIG. 1D includes a waveform acquisition element 31, a waveform segmenting element 33, a phoneme matching element 35, and a text generation element 37. The speech-to-text conversion can include a number of stages. For example, the waveform acquisition can sample the analog audio waveform. The waveform segmentation can break the waveform into individual phonemes (e.g., eliminating laughter, coughing, various background noises, etc.). Phoneme matching can assign a symbolic representation to the phoneme waveform (e.g., using some type of phonetic alphabet). In addition, the text generation can map phonemes to their intended textual representation (e.g., using the term "meet" or "meat"). If more than one mapping is possible (as in this example), a contextual analysis can be used to choose the most likely version.

In operation, media tagging module 52 can be configured to receive a media file (video, audio, etc.) and transform that information into a text tagged file, which is further passed to a document indexing function. More specifically, and in one example implementation, there is a separate workflow that occurs before text extraction activities are performed. This separate workflow can address media files, which require some type of conversion from audio to text. For example, if a video file were to be received, audio information would be identified and, subsequently, converted to text information to identify relevant enterprise vocabulary. An audio stream can be converted to a phonetic index file (i.e., a phonetic audio track). Once the phonetic index file is created, an enterprise vocabulary can be applied to search for enterprise terms within this phonetic index file. In one instance, the enterprise vocabulary may include one or more whitelist words, which can be developed or otherwise configured (e.g., by an administrator).

Applying the enterprise vocabulary can include, for example, taking each word within the enterprise vocabulary and searching for those particular words (e.g., individually) in the audio track. For example, for an enterprise vocabulary of 1000 words, a series of application program interfaces (APIs) can be used to identify that a given word ("meet") is found at specific time intervals (T=3 seconds, T=14 seconds, T=49 seconds, etc.). The resultant could be provided as a list of 40 words (in this particular example).

This list can be checked against a personal vocabulary database, which is particular to the end user who is seeking to send, receive, upload, etc. this media file. Thus, the personal vocabulary (e.g., having 250 words) can be loaded and leveraged in order to eliminate false positives within the 40 words. This could further reduce the resultant list to 25 words. A resulting text file can be fed to text extraction module 58 for additional processing, as outlined herein.

FIG. 1E is a simplified block diagram that illustrates additional details relating to an example implementation of media tagging module 52. Media tagging module 52 may include a video-to-audio converter 72, a phoneme engine 74, a tagged file 76, a thumbnail module 92, a memory element 94, a processor 96, and a personal vocabulary database 78. A raw video file 82 can be sought to be uploaded by end user 12, and it can propagate through media tagging module 52 in order to generate tagged data with false positives removed 84. Additionally, a search module 98 is also provided in FIG. 1E and this element can interact with media tagging module 52 in order to search information that has already been intelligently filtered using the various mechanisms outlined herein. For example, a search interface could be provided (to a given end user) and the interface could be configured to initiate a search for particular subject areas within a given database. The removal of false positives can occur at an indexing time such that when an end user provides a new search to the system, the database is more accurate and, therefore, a better search result is retrieved.

In the context of one example flow, media can be extracted from HTTP streams, where it is subsequently converted to audio information. The audio track can be phonetic audio track (PAT) indexed. Appropriate tags can be generated and indexed, where thumbnails are transported and saved. Queries can be then served to the resulting database of entries (e.g., displayed as thumbnails), where relevant video and audio files can be searched. Duplicate video entries can be removed, modified, edited, etc. on a periodic basis (e.g., by an administrator, or by some other individual). In addition, the appropriate video or audio player can offer a suitable index (e.g., provided as a "jump-to" feature) that accompanies the media.

Speech recognition can be employed in various media contexts (e.g., video files, Telepresence conferences, phone voicemails, dictation, etc.). In addition, any number of formats can be supported by communication system 10 such as flash video (FLV), MPEG, MP4, MP3, WMV, audio video interleaved (AVI), MOV, Quick Time (QT) VCD, MP4, DVD, etc. Thumbnail module 92 can store one or more thumbnails on a platform that connects individual end users. The platform could be (for example) used in the context of searching for particular types of information collected by the system. Note that any of the video and media tagging, speech recognition, etc. can be incorporated into the data segment analysis for generating suitable argument maps. Any of the processing activities discussed herein can readily cooperate with the argument map development.

Figure 2:
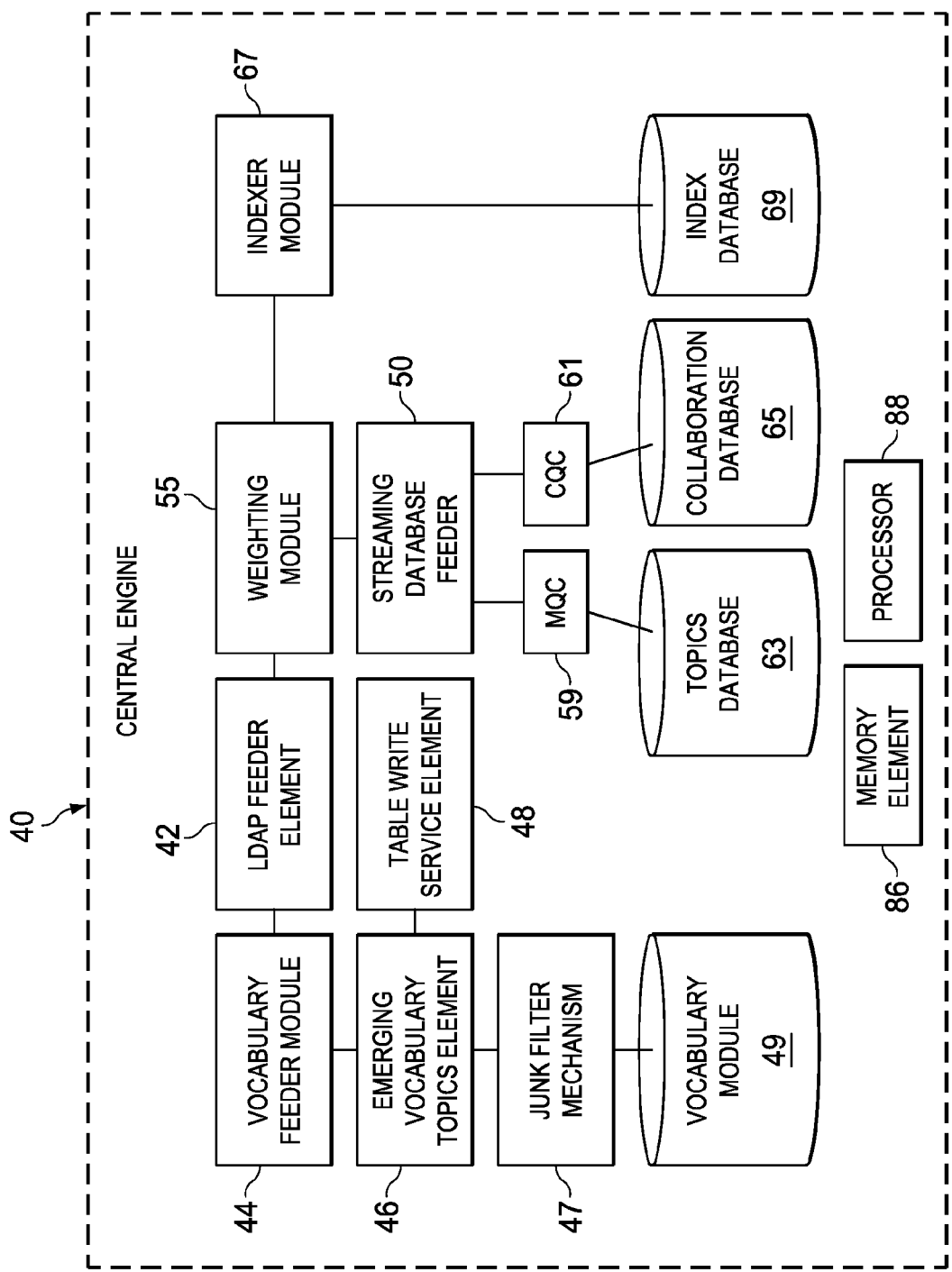
FIG. 2 is a simplified block diagram of a central engine in the communication system in accordance with one embodiment.

Turning to technical details related to how the personal vocabulary is developed, FIG. 2 is a simplified block diagram of an example implementation of central engine 40. Central engine 40 includes a memory element 86 and a processor 88 in this particular configuration. Central engine 40 also includes a junk filter mechanism 47 (which may be tasked with removing erroneous vocabulary items), a vocabulary module 49, a weighting module 55, a streaming database feeder 50, a MQC 59, a CQC 61, a topics database 63, a collaboration database 65, an indexer module 67, and an index database 69. Indexer module 67 is configured to assist in categorizing the words (and/or noun phrases) collected in communication system 10. Those indices can be stored in index database 69, which can be searched by a given administrator or an end user. Along similar reasoning, topics database 63 can store words associated with particular topics identified within the personal vocabulary. Collaboration database 65 can involve multiple end users (e.g., along with administrator 20) in formulating or refining the aggregated personal vocabulary words and/or noun phrases. In regards to vocabulary module 49, this storage area can store the resultant composite of vocabulary words (e.g., per individual), or such information can be stored in any of the other databases depicted in FIG. 2. It is imperative to note that this example of FIG. 2 is merely representing one of many possible configurations that central engine 40 could have. Other permutations are clearly within the broad scope of the tendered disclosure.

In operation of a simplified example used for discussion purposes, the extraction and processing operations can be performed on network sensor 54, where those results may be provided to central engine 40 for building personal vocabulary. With respect to the initial text stripping operations, noun phrase extractor module 64 can find the noun phrases in any text field. In more specific implementations, pronouns and single words are excluded from being noun phrases. A noun phrase can be part of a sentence that refers to a person, a place, or a thing. In most sentences, the subject and the object (if there is one) are noun phrases. Minimally, a noun phrase can consist of a noun (e.g., "water" or "pets") or a pronoun (e.g., "we" or "you"). Longer noun phrases can also contain determiners (e.g., "every dog"), adjectives (e.g., "green apples") or other preceding, adjectival nouns (e.g., "computer monitor repair manual"), and other kinds of words, as well. They are called noun phrases because the headword (i.e., the word that the rest of the phrase, if any, modifies) is a noun or a pronoun. For search and other language applications, noun phrase extraction is useful because much of the interesting information in text is carried by noun phrases. Also, most search queries are noun phrases. Thus, knowing the location of the noun phrases within documents and, further, extracting them can be an important step for tagging applications.

For the end-user interface, periodically, terms can be suggested to the administrator for adding to the vocabulary. The existing interface for user-suggested vocabulary could be used for displaying the terms to the administrator. In one example implementation, a stop word removal feature can be provided on central engine 40 (e.g., this could make implementation of the feedback loop more efficient). In other instances, the stop word removal feature is placed on network sensor 54 so that only the filtered fields are sent over to central engine 40. The concept field can be accessible like other fields in the received/collected documents. The concept field is a list of string field values. Additional functionalities associated with these operations are best understood in the context of several examples provided below.

While this is occurring, in a separate workflow personal vocabulary can be developed. Thus, communication system 10 can generate personal vocabulary using corporate vocabulary, which is propagating in the network. In practical terms, it is difficult to tag all user traffic in a corporate (i.e., enterprise) environment. There are two modes in which corporate vocabulary can be generated. First, in a learning mode, where end users are not yet subscribed, automatic corporate vocabulary can be generated by tagging content as it flows through the network. This can be generated by tagging content anonymously in the network. This typically happens in the learning mode of the system, where no users are subscribed on the system. The user whose content is being tagged is not necessarily of interest at the time of corporate vocabulary generation. Second, in a real-time system scenario, as users begin using the system, users have the ability to suggest new words to the corporate vocabulary through a manual process, feedback loops, etc., which are detailed herein.

By contrast, personal vocabulary generation can use corporate vocabulary to tag words for particular users. As documents (e.g., email/http/videos, PDF, etc.) flow through the network, the system checks for words from the corporate vocabulary, tags the appropriate words (e.g., using a whitelist), and then associates those words with particular users. Communication system 10 can include a set of rules and a set of algorithms that decide whether tagged words should be added to a personal vocabulary. Rules include common term threshold, group vocabulary adjustment, etc.

Over a period, the user's personal vocabulary develops into a viable representation of subject areas (e.g. categories) for this particular end user. In addition, the user has the ability to add words to his personal vocabulary manually. He also has the ability to mark individual words as public or private, where the latter would prohibit other users in the system from viewing those personal vocabulary words.

Many of these activities can be accomplished by using streaming databases in accordance with one example implementation. In one particular instance, this involves the use of streaming database feeder 50. A streaming database continuously analyzes massive volumes of dynamic information. Streaming database feeder 50 can create a user sub-stream for each user, where the tags could continuously be updated for that user. By writing a simple query, an individual can derive the most prevalent topics (e.g., based on a normalized count and time).

FIGS. 3 and 4 offer two distinct workflows for communication system 10. FIG. 3 addresses the corporate vocabulary formation, whereas FIG. 3 addresses the personal vocabulary development. It should also be noted that these illustrations are associated with more typical flows involving simplistic documents propagating in a network (e.g., email, word processing documents, PDFs, etc.).

FIG. 3 is a simplified flowchart illustrating one example operation associated with communication system 10. In this particular flow, at step 110, end user 12 has written an email that includes the content "Optical Switching is a terrific technology." This email message can traverse the network and be received at a router (e.g., a large corporate router, a switch, a switched port analyzer (SPAN) port, or some type of virtual private network (VPN) network appliance). This is reflected by step 120. Network sensor 54 can be provisioned at such a location in order to capture data and/or facilitate the identification of content, as described herein.

In this particular example, FIFO element 56 may receive data in a raw format at step 130. Text extraction module 58 may extract certain fields in order to identify a title, text, authorship, and a uniform resource locator (URL) associated with this particular document at step 140. [Note that as used herein in this Specification, the term 'separate' is used to encompass extraction, division, logical splitting, etc. of data segments in a data flow. The term 'tag' as used herein in this Specification, is used to encompass any type of labeling, maintaining, identifying, etc. associated with data.] Note that for this particular instance (where an email is being sent), the URL can have a blank field. The title may include a subject line, or an importance/priority parameter, and the text field would have the quoted statement (i.e., content), as written above. The document is then passed to blacklist 60, which searches (i.e., evaluates) the document to see if any blacklisted words are found in the document (step 150). If any such blacklisted words are present, the document is dropped. In one general sense, there are two layers of privacy provided by blacklist 60 and whitelist 66, which are working together. Examples of blacklist words in a corporate environment may include 'salary', 'merger', etc., or possibly words that might offend public users, compromise privacy issues, implicate confidential business transactions, etc. Note that the blacklist (much like the whitelist) can readily be configured by administrator 20 based on particular user needs. The term 'whitelist' as used herein in this Specification is meant to connote any data sought to be targeted for inclusion into the resultant composite of words for administrator 20. Along similar reasoning, the term 'blacklist' as used herein is meant to include items that should not be included in the resultant composite of words.

Provided that the document in this instance is not dropped as a result of the blacklist check, the document passes to document filter 62. Document filter 62 performs a quick check of the type of document that is being evaluated at step 160. Again, this component is configurable as an administrator can readily identify certain types of documents as including more substantive or meaningful information (e.g., PDF or Word processing documents, etc.). Along similar reasoning, some documents (such as JPEG pictures) may not offer a likelihood of finding substantive vocabulary (i.e., content) within the associated document. These more irrelevant documents may be (as a matter of practice) not evaluated for content and any such decision as to whether to ignore these documents (e.g., JPEG pictures), or scrutinize them more carefully would be left up to administrator 20.

In one example, noun phrase extractor module 64 includes a natural language processing (NLP) component to assist it in its operations. Note that a similar technology may exist in text extraction module 58 to assist it in its respective operations. One objective of noun phrase extractor module 64 is to extract meaningful objects from within text such that the content can be aggregated and further processed by communication system 10. In this example, noun phrase extractor module 64 performs its job by extracting the terms "optical switching" and "technology." This is illustrated by step 170.

Once this document has propagated through noun phrase extractor module 64, the document passes to whitelist 66 at step 180. An administrator may wish to pick up certain whitelisted words in the content, as it propagates through a network. The whitelist can be used on various fields within communication system 10. In this particular example, the whitelist is used to search the title and text fields. At this point, the document is sent to document splitter element 68. Note that there are two documents being created from the original document. In one instance, document splitter element 68 can receive a document with five fields including the concept field (at step 190), and perform several operations. First, it creates document #2 using the concept field in document #1. Second, it removes the concept field from document #1. Third, it can remove all fields except the concept field from document #2. Fourth, it can send both document #1 and document #2 to clean topics module 70.

It should be noted that noun phrase extractor module 64 operates best when considering formal statements (e.g., using proper English). Colloquialisms or folksy speech is difficult to interpret from the perspective of any computer system. More informal documentation (e.g., email) can be more problematic, because of the speech that dominates this forum.

Clean topics module 70 is configured to address some of these speech/grammar issues in several ways. In one example implementation, clean topics module 70 can receive two documents, as explained above. It passes document #1 without the concept field. For document #2, having the concept field, it can be configured to employ stop word removal logic at step 200. In this particular arrangement, the following stop words can be removed: first name, last name, userid; functional stop word: A, an, the, etc.; email stop words: regards, thanks, dear, hi, etc.; non-alphabets: special characters, numbers; whitelist words: all words found in a whitelist file configured by the administrator; administrator stop words: administrator rejected system words. Note that the operation of filtering functional stop words is different from filtering email (e.g., administrator stop words). For example, "Back Of America" would not be processed into "Bank America." Thus, stop words between two non-stop words would not necessarily be removed in certain instances.

In addition, and in this particular example, the following rules can be applied: Rule 1: Remove the entire noun phrase if a substring match is found; Rule 2: Remove only the offending culprit; Rule 3: Remove the entire noun phrase if an exact match is found. Particular to this example, rules can be applied in the following order: Drop concept fields containing non-alphabets (Rule 1); Drop concept fields containing (e.g., LDAP) entries (Rule 1); Drop concept fields containing email stop words (Rule 1); Remove the functional stop word only if it is at either end of the concept field. Do not drop the words found in between, apply rule iteratively (Rule 2). Drop the concept field value if it is an exact match with the whitelist words (Rule 1). Drop the concept field value if it is an exact match with the administrator stop words (Rule 1). Note that LDAP filtering can also occur during these activities. For example, if any proper names already in LDAP are identified, the filter can just drop those terms.

Vocabulary feeder module 44 can receive the documents (e.g., on the central engine side) at step 210. Vocabulary feeder module 44 forwards the document without the concept field and, for the document with the concept field, it sends it to streaming database feeder 50. In one instance, the streams are associated with storage technology, which is based on a stream protocol (in contrast to a table format). In other instances, any other suitable technology can be employed to organize or to help process the incoming documents, content, etc. The streams can be updated by vocabulary feeder module 44.

More specifically, the analytics approach of central engine 40 (in one example) involves having queries analyze streaming data. This strategy for handling continuously flowing data is different from traditional business intelligence approaches of first accumulating data and then running batch queries for reporting and analysis. Such an approach enables analysis of heterogeneous data regardless of whether the data is flowing, staged, etc. In addition, queries are continuous and constantly running so new results are delivered when the downstream application can use them. Data does not need to be stored or modified, so the system can keep up with enormous data volumes. Thousands of concurrent queries can be run continuously and simultaneously on a server architecture. Queries can be run over both real-time and historical data. Incoming data can be optionally persisted for replay, back-testing, drill-down, benchmarking, etc.

Returning to the flow of FIG. 3, vocabulary feeder module 44 can read the concept field (e.g., created by the NLP module) and can feed the noun phrases to the raw vocabulary stream (e.g., "raw_vocab_stream" file) at step 220. The vocabulary feeder mechanism can calculate the weight of each of the topics in the concept field by looking up a hash map (initialized from a file) between the number of terms and corresponding weight and, subsequently, feed the topic, calculated weight, and timestamp into the raw vocabulary stream. The vocabulary feeder's output can be configured to interface with the vocabulary stream. The streams aggregate the topics into (for example) a weekly collapsed vocabulary table (e.g., "weekly_collapsed_vocab_table" file), which could be updated during any suitable timeframe (e.g., hourly). This table serves as input to table write service element 48.

In regards to the periodic write service, a periodic service can invoke the write to administrator table service, as explained above. This service can be configurable for the following: silent mode, hourly, daily, weekly, monthly. Hourly, daily, weekly, and monthly modes designate that the terms are suggested to an administrator on the specified intervals. Hourly intervals could be used for testing purposes. A silent mode offers a file based approach, where terms are written to a file, and do not make it to the administrator user interface.

For table write service element 48, a service layer can read the weekly collapsed vocabulary table for the top words and write to the administrator user interface table. The administrator user interface table can represent the shared table between user-suggested vocabulary terms and the system suggested vocabulary terms. Administrator suggest interface 38 can read the user-suggested vocabulary table ("userSuggestedVocabulary table") to display the terms. This module can suggest the top 'n' words to the administrator for adding to the vocabulary whitelist. Feedback loop module 36 may include application program interfaces (APIs) being provided to create a file from the table of suggested vocabulary terms.

In this example, administrator suggest interface 38 reads the weekly collapsed vocabulary table to display the terms at step 230. This element also suggests the top (e.g., 'n') words to administrator 20 for addition to the vocabulary whitelist. The administrator is provided a user interface to make decisions as to whether to add the term to the whitelist, add it to the blacklist, or to ignore the terms. In one example implementation, the administrator does not suggest new stop words. Only system suggested (or user suggested) stop words can be rejected.

Feedback loop module 36 is coupled to administrator suggest interface 38. In case the administrator chooses the "reject term" option, the system can add the term to the list of existing stop words and, further, propagate it to network sensor 54 to copy over to a file (e.g., adminStopWords.txt). This is reflected by step 240. Network collaboration platform 32 can create a file from the table suggested vocabulary terms (e.g., via commands including suggestedby=system, and status=rejected). This file can be a part of the force sync files that can be pushed to the network sensor/central engine (depending on where the stop words mechanism resides). At step 260, emerging vocabulary topics element 46 can look up emerging topics (e.g., within harvested documents) and, systematically, add the emerging and top topics to the architecture for the administrator to consider. Both options can be provided to administrator 20. The emerging topics can be similar to the experience tags such that topics growing in prominence over a given time interval (e.g., a week) can be suggested to administrator 20.

FIG. 4 is a simplified flowchart illustrating one example operation associated with communication system 10. In this particular flow, an email is written from a first end user (John) to a second end user (Bill) at step 210. The email from John states, "Search engines are good" and this is evaluated in the following ways. First, authorship is identified and the email is searched for blacklisted and whitelisted words at step 220. In essence, a number of text stripping operations occur for the received document (as outlined previously above in FIG. 3). Second, the whitelisted words are received at LDAP feeder element 42 at step 230. In one sense, the appropriate concept has been extracted from this email, where insignificant words have been effectively stripped from the message and are not considered further.

At step 240, John is associated with the term "search engine" based on John authoring message and, in a similar fashion, Bill is associated with the term "search engine" based on him receiving this message. Note that there is a different weight associated with John authoring this message, and Bill simply receiving it. At step 250, weighting module 55 can be invoked in order to assign an intelligent weight based on this message propagating in the network. For example, as the author, John may receive a full point of weight associated with this particular subject matter (i.e., search engines). As the recipient, Bill may only receive a half point for this particular subject matter relationship (where Bill's personal vocabulary would include this term, but it would not carry the same weight as this term being provided in John's personal vocabulary).

In addition, and as reflected by step 260, weighting module 55 may determine how common this word choice (i.e., "search engine") is for these particular end users. For example, if this were the first time that John has written of search engines, it would be inappropriate to necessarily tag this information and, subsequently, identify John as an expert in the area of search engines. This email could be random, arbitrary, a mistake, or simply a rare occurrence. However, if over a period, this terminology relating to search engines becomes more prominent (e.g., reaches a threshold), then John's personal vocabulary may be populated with this term.

In this particular example, several days after the initial email, John sends Bill a second email that includes a white paper associated with search engines, along with an accompanying video that is similarly titled. This is reflected by step 270. Central engine 40 has the intelligence to understand that a higher weight should be accorded to this subsequent transmission. Intuitively, the system can understand that certain formats (White Papers, video presentations, etc.) are more meaningful in terms of associating captured words with particular subject areas. At step 280, weighting module 55 assigns this particular transmission five points (three points for the White Paper and two points for the video presentation), where the five points would be allocated to John's personal vocabulary associated with search engines. In addition, Bill is also implicated by this exchange, where he would receive a lesser point total for (passively) receiving this information. In this instance, and at step 290, Bill receives three points as being a recipient on this email. At step 300, the point totals are stored in an appropriate database on a per-user basis.

Additionally, over time, a social graph can be built based on the connection between John and Bill and, in particular, in the context of the subject area of search engines. In one sense, the weight between these two individuals can be bidirectional. A heavier weight is accorded to John based on these transmissions because he has been the dominant author in these exchanges. If Bill were to become more active and assume an authorship role in this relationship, then the weight metric could shift to reflect his more proactive involvement. In one particular example, a threshold of points is reached in order for Bill's personal vocabulary to include the term 'search engine.' This accounts for the scenario in which a bystander is simply receiving communications in a passive manner.

The architecture discussed herein can continue to amass and aggregate these counts or points in order to build a personal vocabulary (e.g., personal tags) for each individual end user. The personal vocabulary is intelligently partitioned such that each individual has his own group of tagged words to which he is associated. At the same time, a social graph can continue to evolve as end users interact with each other about certain subject areas.

In contrast to other systems that merely identify two individuals having some type of relationship, the architecture provided herein can offer the context in which the relationship has occurred, along with a weighting that is associated with the relationship. For example, with respect to the John/Bill relationship identified above, these two individuals may have their communications exclusively based on the topic of search engines. Bill could evaluate his own personal vocabulary and see that John represents his logical connection to this particular subject matter. He could also evaluate other less relevant connections between his colleagues having (in this particular example) a weaker relationship associated with this particular subject matter. Additionally, an administrator (or an end user) can construct specific communities associated with individual subject matter areas. In one example, an administrator may see that John and Bill are actively involved in the area of search engines. Several other end users can also be identified such that the administrator can form a small community that can effectively interact about issues in this subject area.

In another example, entire groups can be evaluated in order to identify common subject matter areas. For example, one group of end users may be part of a particular business segment of a corporate entity. This first group may be associated with switching technologies, whereas a second group within the corporate entity may be part of a second business segment involving traffic management. By evaluating the vocabulary exchanged between these two groups, a common area of interest can be identified. In this particular example, the personal vocabulary being exchanged between the groups reveals a common interest in the subject of deep packet inspection.

Note that one use of the resulting data is to create a dynamic file for each individual user that is tracked, or otherwise identified through communication system 10. Other applications can involve identifying certain experts (or group of experts) in a given area. Other uses could involve building categories or subject matter areas for a given corporate entity. Note also that communication system 10 could accomplish the applications outlined herein in real time. Further, the association of the end users to particular subject matter areas can then be sent to networking sites, which could maintain individual profiles for a given group of end users. This could involve platforms such as Facebook, LinkedIn, etc. The dynamic profile can be supported by the content identification operations associated with the tendered architecture. In other applications, video, audio, and various multimedia files can be tagged by communication system 10 and associated with particular subject areas, or specific end user groups. In one instance, both the end user and the video file (or the audio file) can be identified and logically bound together or linked.

Software for providing intelligent vocabulary building and argument map functionality can be provided at various locations. In one example implementation, this software is resident in a network element, such as central engine 40, NCP 32, and/or network sensor 54, or in another network element for which this capability is relegated. In other examples, this could involve combining central engine 40, NCP 32, and/or network sensor 54 with an application server or a gateway, or some proprietary element, which could be provided in (or be proximate to) these identified network elements, or this could be provided in any other device being used in a given network. In one specific instance, central engine 40 provides the personal vocabulary building features explained herein, while network sensor 54 can be configured to offer the argument map activities detailed herein. In such an implementation, network sensor 54 can initially receive the data, employ its media tagging functions, and then send the results to a text extraction mechanism, which can develop or otherwise process this information in order to develop suitable argument maps.

In other embodiments, the argument map features may be provided externally to network sensor 54, NCP 32, and/or central engine 40, or included in some other network device, or in a computer to achieve these intended functionalities. As identified previously, a network element can include software to achieve the argument map and vocabulary building operations, as outlined herein in this document. In certain example implementations, the argument map and vocabulary building functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in some of the preceding FIGURES] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor [as shown in some of the preceding FIGURES] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the argument mapping and vocabulary building operations as outlined herein. Additionally, each of these devices may include a processor that can execute software or an algorithm to perform the vocabulary building and argument mapping activities, as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the examples provided herein, interaction may be described in terms of two, three, four, or more network elements. However, this has been done for purposes of clarity and example only. In certain cases, it may be easier to describe one or more of the functionalities of a given set of flows by only referencing a limited number of components or network elements. It should be appreciated that communication system 10 of FIG. 1A (and its teachings) are readily scalable. Communication system 10 can accommodate a large number of components, as well as more complicated or sophisticated arrangements and configurations. Accordingly, the examples provided should not limit the scope or inhibit the broad teachings of communication system 10 as potentially applied to a myriad of other architectures.

It is also important to note that the steps described with reference to the preceding FIGURES illustrate only some of the possible scenarios that may be executed by, or within, communication system 10. Some of these steps may be deleted or removed where appropriate, or these steps may be modified or changed considerably without departing from the scope of the discussed concepts. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the discussed concepts.

What is claimed is:

1. A computer-implemented method for a network sensor configured to interface with memory and processor, comprising:
   receiving network traffic associated with a first user and a second user;
   evaluating keywords in the network traffic in order to identify a topic of discussion involving the first and the second users;
   determining a first sentiment associated with a first data segment associated with the first user;
   determining a second sentiment associated with a second data segment associated with the second user;
   deriving one or more statements from the network traffic;
   categorizing the one or more derived statements into argument map attributes, wherein the deriving and the categorizing comprise at least one activity selected from a group consisting of speech recognition, sentiment analysis and basic linguistic models; and
   generating an computer-automated argument map comprising the argument map attributes based on the first data sentiment and the second data sentiment, wherein the automated argument map comprises a visual representation of a structure of an argument in informal logic, wherein the argument map includes components of the argument, comprising main contentions, premises, co-premises, objections, rebuttals, and lemmas.

2. The method of claim 1, further comprising:
   converting a portion of the network traffic from a speech format to a text format in order to determine the first sentiment and the second sentiment.

3. The method of claim 1, wherein the argument map is delivered to the first user and the second user as a result of a discussion terminating between the first user and the second user.

4. The method of claim 1, wherein timestamps and Internet Protocol (IP) addresses associated with the first user and the second user are identified, and wherein an interaction associated with the topic of discussion is chronologically ordered before determining the first sentiment and the second sentiment.

5. The method of claim 1, wherein the network traffic includes email data, media data, video data, and audio data.

6. The method of claim 1, wherein at least a portion of the network traffic includes video data from a video conference that is tagged.

7. The method of claim 1, wherein email header information and signatures are removed before determining the first sentiment and the second sentiment.

8. Logic encoded in one or more tangible non-transitory media that includes code executable by one or more processors, wherein the code causes the one or more processors to perform operation, comprising:
   receiving network traffic associated with a first user and a second user;
   evaluating keywords in the network traffic in order to identify a topic of discussion involving the first and the second users;
   determining a first sentiment associated with a first data segment associated with the first user;
   determining a second sentiment associated with a second data segment associated with the second user;
   deriving one or more statements from the network traffic;
   categorizing the one or more derived statements into argument map attributes, wherein the deriving and the categorizing comprise at least one activity selected from a group consisting of speech recognition, sentiment analysis and basic linguistic models; and
   generating an computer-automated argument map comprising the argument map attributes based on the first data sentiment and the second data sentiment, wherein the automated argument map comprises a visual representation of a structure of an argument in informal logic, wherein the argument map includes components of the argument, comprising main contentions, premises, co-premises, objections, rebuttals, and lemmas.

9. The logic of claim 8, the operations comprising:
   converting a portion of the network traffic from a speech format to a text format in order to determine the first sentiment and the second sentiment.

10. The logic of claim 8, wherein the argument map is delivered to the first user and the second user as a result of a discussion terminating between the first user and the second user.

11. The logic of claim 8, wherein timestamps and Internet Protocol (IP) addresses associated with the first user and the second user are identified, and wherein an interaction associated with the topic of discussion is chronologically ordered before determining the first sentiment and the second sentiment.

12. The logic of claim 8, wherein the network traffic includes email data, media data, video data, and audio data.

13. The logic of claim 8, wherein at least a portion of the network traffic includes video data from a video conference that is tagged.

14. The logic of claim 8, wherein email header information and signatures are removed before determining the first sentiment and the second sentiment.

15. An apparatus, comprising:
   a memory element configured to store data;
   a processor operable to execute instructions associated with the data;
   a network sensor configured to interface with the memory and the processor, wherein the apparatus is configured for:
      receiving network traffic associated with a first user and a second user;
      evaluating keywords in the network traffic in order to identify a topic of discussion involving the first and the second users;
      determining a first sentiment associated with a first data segment associated with the first user;
      determining a second sentiment associated with a second data segment associated with the second user;
      deriving one or more statements from the network traffic;
      categorizing the one or more derived statements into argument map attributes, wherein the deriving and the categorizing comprise at least one activity selected from a group consisting of speech recognition, sentiment analysis and basic linguistic models; and generating an computer-automated argument map comprising the argument map attributes based on the first data sentiment and the second data sentiment, wherein the automated argument map comprises a visual representation of a structure of an argument in informal logic, wherein the argument map includes components of the argument, comprising main contentions, premises, co-premises, objections, rebuttals, and lemmas.

16. The apparatus of claim 15, the apparatus further configured for:

converting a portion of the network traffic from a speech format to a text format in order to determine the first sentiment and the second sentiment.

17. The apparatus of claim 15, wherein the argument map is delivered to the first user and the second user as a result of a discussion terminating between the first user and the second user.

18. The apparatus of claim 15, wherein timestamps and Internet Protocol (IP) addresses associated with the first user and the second user are identified, and wherein an interaction associated with the topic of discussion is chronologically ordered before determining the first sentiment and the second sentiment.

19. The apparatus of claim 15, wherein at least a portion of the network traffic includes video data from a video conference that is tagged.

20. The apparatus of claim 15, wherein email header information and signatures are removed before determining the first sentiment and the second sentiment.

* * * * *